(12) United States Patent
Vitzthum et al.

(10) Patent No.: US 10,382,423 B2
(45) Date of Patent: Aug. 13, 2019

(54) SYSTEMS AND METHODS FOR PROVIDING MULTIMEDIA CONTENT WITHIN AN APPLICATION AND A SECURITY SOLUTION INTEGRATED THEREIN

(71) Applicant: APPA MUSIC GROUP UG, Munich (DE)

(72) Inventors: Thomas Vitzthum, Munich (DE); Thomas Klimpel, Dorfen (DE)

(73) Assignee: APPA MUSIC GROUP UG, Munich (DE)

(*) Notice: Subject to any disclaimer, the term of this patent is extended or adjusted under 35 U.S.C. 154(b) by 0 days.

(21) Appl. No.: 16/132,943

(22) Filed: Sep. 17, 2018

(65) Prior Publication Data

US 2019/0014099 A1 Jan. 10, 2019

Related U.S. Application Data

(63) Continuation of application No. 15/643,628, filed on Jul. 7, 2017, now Pat. No. 10,110,588, which is a
(Continued)

(30) Foreign Application Priority Data

Nov. 9, 2012 (DE) .......................... 10 2012 022 064

(51) Int. Cl.
*G06F 7/04* (2006.01)
*H04L 29/06* (2006.01)
(Continued)

(52) U.S. Cl.
CPC ............ *H04L 63/08* (2013.01); *H04L 63/061* (2013.01); *H04L 65/604* (2013.01); *H04L 67/06* (2013.01);
(Continued)

(58) Field of Classification Search
CPC ..... H04L 63/08; H04L 63/061; H04L 65/604; H04L 2463/101; H04N 21/835;
(Continued)

(56) References Cited

U.S. PATENT DOCUMENTS 6,385,596 B1 5/2002 Wiser et al.
6,591,295 B1 7/2003 Diamond et al.
(Continued)

FOREIGN PATENT DOCUMENTS

EP 2587756 A1 5/2013
EP 2833305 A1 2/2015
(Continued)

OTHER PUBLICATIONS

Sibert, O et al. "Digibox: a Self-Protecting Container for Information Commerce," USENIX Workshop on Electronic Commerce, Jul. 1995.
(Continued)

*Primary Examiner* — Amare F Tabor
(74) *Attorney, Agent, or Firm* — Osha Liang LLP

(57) ABSTRACT

A system is provided for downloading, for distribution and for acoustic reproduction of a music album, which includes at least one or several digital music files and/or multimedia content in the form of one or several multimedia files assignable to the music file, wherein the music file and/or multimedia file are provideable as data sets for downloading, wherein the music file and/or multimedia file are as data sets pre-holdable grouped after downloading as a music album in a data memory of an end-user-device, wherein the music file and/or multimedia file is treatable by a treatment means, particularly in dependency to an authorization, and wherein the treated music file and/or multimedia file is transferable to an output device of the end-user-device, especially a speaker device with or without a display device,
(Continued)

in such a way, that the music file and/or multimedia file is at least acoustically emittable to one user.

17 Claims, 25 Drawing Sheets

Related U.S. Application Data continuation of application No. 14/728,358, filed on Jun. 2, 2015, now Pat. No. 9,705,866, which is a continuation of application No. 13/715,067, filed on Dec. 14, 2012, now Pat. No. 9,083,688.

(51) Int. Cl.
| | |
|---|---|
| *H04W 12/06* | (2009.01) |
| *H04L 29/08* | (2006.01) |
| *H04N 21/258* | (2011.01) |
| *H04N 21/478* | (2011.01) |
| *H04N 21/4782* | (2011.01) |
| *H04N 21/6334* | (2011.01) |
| *H04N 21/835* | (2011.01) |

(52) U.S. Cl.
CPC ....... *H04L 67/10* (2013.01); *H04N 21/25816* (2013.01); *H04N 21/4781* (2013.01); *H04N 21/4782* (2013.01); *H04N 21/47815* (2013.01); *H04N 21/63345* (2013.01); *H04N 21/835* (2013.01); *H04W 12/06* (2013.01); *H04L 2463/101* (2013.01)

(58) Field of Classification Search
CPC ......... H04N 21/63345; H04N 21/4782; H04N 21/47815; H04N 21/4781; H04N 21/25816; H04W 12/06
USPC .............................................. 726/4; 709/217
See application file for complete search history.

(56) References Cited

U.S. PATENT DOCUMENTS

| | | | |
|---|---|---|---|
| 7,251,832 B2 | 7/2007 | Venters, III et al. | |
| 7,466,823 B2 | 12/2008 | Vestergaard et al. | |
| 7,493,499 B1 | 2/2009 | Deaver et al. | |
| 7,509,667 B1* | 3/2009 | Cook .................. | H04N 7/1675 380/200 |
| 7,570,768 B2 | 8/2009 | Cahill et al. | |
| 7,823,210 B2* | 10/2010 | Bessonov ............... | G06F 21/10 709/246 |
| 8,266,430 B1 | 9/2012 | Lumb | |
| 8,397,068 B2 | 3/2013 | Shur et al. | |
| 8,397,083 B1 | 3/2013 | Sussland et al. | |
| 8,595,141 B2 | 11/2013 | Hao et al. | |
| 8,745,388 B2* | 6/2014 | Kanungo ............ | H04L 63/0435 380/210 |
| 8,763,058 B2 | 6/2014 | Omernick | |
| 8,769,306 B1 | 7/2014 | Li et al. | |
| 8,914,819 B2 | 12/2014 | Mears et al. | |
| 9,026,782 B2* | 5/2015 | Ahuja .................. | H04L 9/3213 713/150 |
| 2002/0132616 A1 | 9/2002 | Ross et al. | |
| 2002/0146122 A1* | 10/2002 | Vestergaard ...... | H04L 29/06027 380/231 |
| 2003/0105718 A1* | 6/2003 | Hurtado .................. | G06F 21/10 705/51 |
| 2004/0260786 A1 | 12/2004 | Barile | |
| 2006/0004471 A1 | 1/2006 | Matsuura | |
| 2007/0022306 A1 | 1/2007 | Lindsley | |
| 2007/0067408 A1 | 3/2007 | Prouvost | |
| 2007/0294186 A1 | 12/2007 | Yan | |
| 2008/0247543 A1 | 10/2008 | Mick et al. | |
| 2008/0307462 A1 | 12/2008 | Beetcher et al. | |
| 2009/0070411 A1 | 3/2009 | Chang et al. | |
| 2010/0031366 A1 | 2/2010 | Knight et al. | |
| 2010/0169669 A1 | 7/2010 | Smith | |
| 2010/0185854 A1 | 7/2010 | Burns et al. | |
| 2010/0189424 A1 | 7/2010 | Doehla et al. | |
| 2010/0255890 A1 | 10/2010 | Mikkelsen et al. | |
| 2010/0262909 A1 | 10/2010 | Hsieh | |
| 2010/0325702 A1 | 12/2010 | Su | |
| 2011/0004642 A1 | 1/2011 | Schnitzer | |
| 2011/0154198 A1 | 6/2011 | Bachman et al. | |
| 2011/0283105 A1 | 11/2011 | Shuster | |
| 2012/0185693 A1 | 7/2012 | Chen et al. | |
| 2012/0189116 A1 | 7/2012 | Catrein et al. | |
| 2012/0311721 A1 | 12/2012 | Chen et al. | |
| 2013/0061045 A1 | 3/2013 | Kiefer et al. | |
| 2013/0138956 A1 | 5/2013 | Swist | |
| 2013/0304777 A1 | 11/2013 | Bilinski et al. | |
| 2014/0052996 A1 | 2/2014 | Nin et al. | |
| 2014/0156791 A1 | 6/2014 | Sant et al. | |

FOREIGN PATENT DOCUMENTS

| | | |
|---|---|---|
| WO | 2009049352 A1 | 4/2009 |
| WO | 2012094487 A2 | 7/2012 |

OTHER PUBLICATIONS

Network Computing. "PGP Corporation Launches New Mobile Data Protection And Security Solutions" [Press Release], Jul. 20, 2009 [Retrieved on Jun. 7, 2018]. Retrieved from the Internet<<https://www.networkcomputing.com/careers/pgp-corporation-launches-new-mobile-data-protection-and-security-solutions/1222455355>>.

Furht, B. et al. Multimedia Encryption and Authentication Techniques and Applications. Auerbach Publications, 2006.

Tera Consultants, International Chamber of Commerce/BASCAP, "Mar. 2010 Building a Digital Economy: The Importance of Jobs in the EU's Creative Industries." (68 pages).

Biophilia (Album), Studio Album by Bjork, Released Oct. 10, 2011, http://en.m.wikipedia.org/wiki/Biophilia_(album), Jun. 20, 2014 (26 pages).

British Intellectual Property Office, Combined Search and Examiner Report dated Mar. 31, 2014, Application No. GB1319727.2, www.ipo.gov.uk (8 pages).

Non-Final Rejection dated Jul. 25, 2014, in U.S. Appl. No. 13/715,067 (19 pages).

Non-Final Rejection dated Mar. 11, 2016, in U.S. Appl. No. 14/728,358 (22 pages).

Non-Final Rejection dated Oct. 17, 2016, in U.S. Appl. No. 14/728,358 (8 pages).

\* cited by examiner

SYSTEMS AND METHODS FOR PROVIDING MULTIMEDIA CONTENT WITHIN AN APPLICATION AND A SECURITY SOLUTION INTEGRATED THEREIN

CROSS-REFERENCE TO RELATED APPLICATIONS

This application is a continuation of U.S. application Ser. No. 15/643,628 filed Jul. 7, 2017, which is a continuation of U.S. application Ser. No. 14/728,358 filed Jun. 2, 2015, now U.S. Pat. No. 9,705,866 issuing Jul. 11, 2017, which is a continuation of U.S. application Ser. No. 13/715,067 filed Dec. 14, 2012, now U.S. Pat. No. 9,083,688 issued Jul. 14, 2015, which in turn claims foreign priority benefits under 35 U.S.C. § 119(a)-(d) to German Patent Application No. DE 102012022064.2 filed Nov. 9, 2012, the disclosures of which are incorporated by reference in their entirety.

TECHNICAL FIELD

The disclosure relates to a system and a method for playing one or more music files and/or multimedia files, particularly in the form of a music album assignable digital music files, and to an end-user-device by means of which the system can be stored and executed.

BACKGROUND

Background of the present disclosure is that in 2012, still 95 percent of all music downloads were made illegal. Thus the European Creative Industry will lose a turnover of about 240 billion euros due to this type of piracy till 2015. The losses due to free downloading of music, videos and films could cost the creative industry in Europe alone till 2015 about 1.2 million jobs. (Source: Study "Building a Digital Economy: The Importance of Saving Jobs in the EU's Creative Industries", 2009, TERA Consultants).

The main problem is that piracy is very easy to carry out respectively it is too easy to get free music, videos and movies respectively to disseminate them. The financial damage for the music industry in 2009 caused by piracy (worldwide) amounts more than 4 billion euros estimated by the industry association.

However, in 2010 sales of downloaded music increased by 6 percent to 4.6 billion dollars (3.4 billion euros). Meanwhile, almost a third of all sales of the record companies comes from the digital business: The proportion grew in 2011 by 6 percentage points to 29 percent. It can be seen a very strong trend that sales will increase in this area in the upcoming years significantly. The share of digital revenues in the global music market in 2012 is 29%. In the U.S. the share is, however, already nearly 50%, while in Europe the proportion is still at 20% and therefore has an even greater potential for growth. In 2010, with an increase of 20% Europe had the largest growth in the digital market, and also has a more stable physical recorded music market.

Additionally, attention should be paid to a steady increase in mobile used end-user-devices. Until 2016, according to market research the expenditure on mobile marketing should increase by eight times. Hereby an enormous growth market, especially in the mobile sector, can be seen by inference. Another notable development takes place in the field of mobile operators that offer due to changing pricing structures simple and cheap tariffs en mass, especially with so-called download flat rates. Such downloads flat rates allow to receive large data packets via mobile device or tablet PC which caused even in the recent history of this technology area huge costs. Due to the more and more widespread storage of data in the internet or in the cloud, the data is often not locally stored on the devices of the users, but on servers and can be use over the Internet anywhere in the world, on any device (computer, tablet pc and mobile phone, especially smartphone), in particular using a password. Music, movies, photos and documents are not only stored in the cloud, but with special features of the cloud directly usable. For example, a playback function exists with which you can listen to music stored in the cloud via a player of the app. This is firstly advantageous because the data stored in the cloud can be rendered by means of a player of the app and a direct access to this data will not be possible, so that the illegal distribution is restricted. On the other hand, this is a disadvantage, since a permanent transfer of data from the cloud to the end-user-device must be performed, thus to maintain the data connection a high energy requirement is needed, which has in particular an extremely negative impact on the maximum operating time of mobile devices.

SUMMARY

It is therefore an object of the present disclosure to provide a system, a method and an end-user-device for carrying out the system, by means of which the disadvantages known from the prior art, i.e., the easy distribution of digital media and the high effort of cloud solutions, will be removed.

The solution of the aforementioned object is on the one hand according to claim 1 by means of a system or an application (hereinafter App) for the distribution and playback of digital media, in particular from a music album relatable digital music files respectively at least a music file or video files, particularly at least one music file and/or multimedia file. The digital media are preferably at least temporarily provideable as encrypted data sets on an end-user-device and by a processing means of the system as a function of an authorization treated, in particular at least decoded, suppliable to an output device of an end-user-device, in particular a speaker means, for outputting to a user. Moreover, user identification data, in particular user-specific profile information, which are recorded for the authorization by the system, are preferably interchangeable with data that are held on a server device. Due to the system of the disclosure a user can store, run or play a single piece of music or a plurality of music pieces on his end-user-device. Here, at least a piece of music respectively a CD-Single or multiple pieces of music in the form of a music album corresponding multimedia content in the form of multimedia files may be included.

According to a preferred embodiment of the present disclosure, the system or a storable and executable control program for rendering digital media, which in particular can be output by means of an end-user-device, at least one storage means, by means of which the digital media can be stored in a data memory of the end-user-device, wherein at least one part of the digital media is temporarily encrypted. Further, the control program comprises a control means for comparison of authorization data with data pre-held on a server device, wherein the control means transmits the authorization data by means of a transmitting device of the end-user-device to the server device and wherein by the control means after the comparison of the authorization data a decryption code transmitted from the server means to decrypt at least parts of the encrypted digital media stored by the storing means is processable. Further the control program comprises a treatment means by means of which the digital media is decrypted based on the decryption key and is transferable and outputable acoustically, in particular transferable to a loudspeaker device of the end-user-device.

This inventive solution is highly advantageous, since it pre-holds digital media to be output in particular in the form of digital music files identifiable from a music album at least temporarily, in particular until a proper authorization of the operator and/or one or more end-user-devices is carried out, as encrypted data and thus protected from illegal distribution. Further, the encrypted data sets are part of the system respectively of the control software and thus linked with additional means, in particular the control means and the processing means, that simple copying, e.g., of an mp3 file, from the system respectively the control software is not possible. Further, the inventive solution provides due to the local storage of the data sets the advantage that after successful authorization an acoustic output of the music files can be carried out, without a further data comparison respectively data exchange with a server device would be necessary.

With the disclosure system and the inventive control software, a new medium and a new distribution channel for digital media is provided. The used system respectively control software architecture and the built-in encryption of the digital media or media files pre-hold as data sets in the storage means allow a new kind of rights management of digital content. The storage means may be referred to as "media safe", which forms inside of the system respectively the control software for unauthorized persons an inaccessible data area in which the digital media is pre-hold in the form of data-sets. The system respectively the control software is therefore self-contained, so that at least the processing means respectively player components and the storage means respectively the "media safe" with encrypted content form a whole. Preferably, further action means, particularly for issuing of bonus content with respect to the artists, can be part of this unit. In this system and the control software are preferably exactly used one or at least one encryption method, or at least two, exactly two or several of encryption schemes, allowing the safe use of digital media as well as advanced control for the right holders. The system or the control software restricts use compared to unprotected data, such as mp3 files, preferably by one, several or a combination of several of preferably in the following named measures/properties.

Digital media are secured within the system respectively the control software and in particular by the storage means respectively in the "media safe" by use of respectively in form of a file encrypted with the Advanced Encryption Standard (AES algorithm).

A decryption key, especially a 256-bit or 512-bit key, is preferably kept online, especially secured, on a server device designed for data exchange with the system respectively the control software. Here, it is conceivable that the decryption key is generated by the system respectively the control software locally on the end-user-device or by combining the system respectively the control software and the server device or only by the server device.

The digital media data stored in the storage means respectively by use of the storage means are preferentially processed with AAC and H.264 codecs, preferably are provided in MPEG-4 containers. They are only after decryption of the "media's safe" respectively the encrypted data-sets pre-hold in the memory means, containing the digital media in particular in the form of a music album assignable digital music files, treatable by the treatment means, i.e., preferably are outputable or playable.

It is preferably fixable on how many devices the system respectively the control software with protected digital media, particularly in the form of a music album assignable digital music files is executable to output the music files at the same time or at different times. Preferably, the system respectively the control software is executable on 2 to 10 end-user-devices, and more preferably on 4 to 6 end-user-devices or on max. 5 or on exactly 5 end-user-devices of a user profile assignable to a particular person or group of persons. To do so, each device must be authorized. End-user-devices may be preferably (un-)authorized as often as one likes. It is also conceivable that the system and the control software will only work on a single end-user-device of a user profile assignable to a particular person or group of persons.

Furthermore, it is conceivable that restrictions in space, time and/or content are determinable. It is conceivable that some digital media can be executed only in certain countries, only on certain days or during certain periods and/or in dependency of the age of the operator of the end- user-device. The digital media in particular in the form of a music album assignable digital music files are particularly preferred only within the system respectively the control software but not with other stationary or portable music or video players renderable.

The data-sets with the digital media respectively the media files of the system respectively the control software can since the system respectively the control software and a preferably required online store for purchasing further systems respectively control software exists, especially app album music store, preferably on any platform, especially only for iOS, Android, Mac OS X, Linux, and/or Microsoft Windows, not be played without bypassing the system on different operating systems and devices.

According to a preferred embodiment of the present disclosure, the decrypted digital media consisting of a plurality of data sets which are provided together with a plurality of groups of displayable, particularly in menu form or tiled view via an optical output means of the end-user-device dispensable labels. A first group of terms preferably refers to individually each data-set and corresponds at least partially to the designation of the respective digital medium of the data-set, in particular, it reflects the title of the respective stored data-set of music. A second group of designations reflects preferably a common feature of a plurality of data-sets, especially belonging to a specific album.

This embodiment is advantageous in that by means of the various groups of designations structures, particularly hierarchical structures, are designable in such a way that the treatment means respectively a player means detects, determines and/or outputs precise affinities of certain files that particular contain playable songs of an album to a grouping unit, in particular to the respective album.

According to another preferred embodiment of the present disclosure are in addition to the data-sets, which are preferably representing respectively pre-holding songs of a first album, additional data-sets, especially with songs of another album, by use of the storing means in the data memory storable, which are also at least temporarily encrypted, wherein the second group of designations of the further data-sets differs from the second group of designations of the data-sets.

According to this embodiment it is advantageous that, in the system or in the control program preferably several grouping instances, i.e., preferably a plurality of albums assignable to an artist or group of artists, are pre-holdable, identifiable and/or renderable. The digital media of the data-sets and the digital media of the further data-sets have therefore in accordance with a further preferred embodiment of the present disclosure at least one common characteristic, in particular the data-sets and the further data-sets are assignable to a specific artist or a specific group of artists.

Here, it is conceivable that the individual in a system or control program pre-holded and various grouping instances assigned data-sets can be decrypted with the same or with different decryption keys. Furthermore, it is also conceivable that different restrictions in view of the rendering, in particular with respect to certain geographic areas respectively time periods with respect to rendering and/or age ratings, for different grouping instances, i.e., preferred for different albums, or even for different data sets, i.e., preferred for individual songs, are stored or to be considered for the rendering of the system respectively the control program.

Furthermore, the unencrypted digital media can be stored in accordance with a further preferred embodiment of the present disclosure, by a further storage means or a "common app memory" in the data memory of the end-user-device.

It is beneficial herewith that a partition between data or data sets to be encrypted and data or data sets not to be encrypted respectively always unencrypted data or data sets is possible, whereby especially the encryption effort is reduced to the protected data-sets. Artist relevant data, especially concert dates, biography information and demo data, can therefore preferably be output to the operators even without any successfully completed authorization, to set incentives to buy further albums, merchandising products and concert tickets.

In terms of a further preferred embodiment of the present disclosure, the unencrypted digital media are assigneable to a variety of action means, in particular an information means, a reference means, a documentation means and/or a communication means. The action means can be understood for example as categories or selection areas of the system or of the control program, through which access is made possible for the operator to various thematic and functional units.

The various action means are constructed in accordance with another preferred embodiment of the present disclosure to exchange data with further server devices different from the server devices whereby data-sets assignable to the individual action means which especially comprise digital media, such as interviews, news, magazine collaborations, biographies or lyrics, are transmittable or updateable from the further server devices.

In an age of fast-growing Internet, the therewith associated data flow and the digitalization music offerings must become more extensive. It is no longer sufficient to just hold a CD in a plastic case in a hand. The customer wants "more for his money" and thereby to be more interactively integrated and "closer" to his star.

With the inventive system and control program the user gets new opportunities to interact with digital content and artists as well as the music, media, information and film industry gets more control over the use and distribution of digital media and content.

Digital media, especially in the form of a music album assignable digital music files, are thus directly held respectively integrated respectively packaged in an application, which is preferably obtainable via an App Store. The system or the control program brings back the formerly loved haptic of CDs and DVDs as interactive media app with intuitive and easy handling into the digital age, where music and videos are so far essentially managed as lists only. Besides the provision of digital media protected from piracy, the disclosure thus provides by means of the action means access to additional content, concerning the media data and/or the artists.

The systems and control programs are preferably individually designed and particularly preferred automated programmed and preferably offered for purchase in an online store, especially an app album store.

If the system respectively control program is designed to play back movies, preferred at least a complete video, bonus material and/or an interactive look book, similar to a recent DVD, only with the advantages of direct interaction by the user, i.e., the user can directly interact with the content, the services, shopping links, artist chats etc. are provided, whereby the operator respectively the user is moved out of a lean-back position.

These options provide the artists, bands and music labels chances to avoid the damage they suffered through illegal downloads via internet. The acceptance of apps, the revenue therewith and the growing mobile market show the opportunities and needs in this growing industry. The added value of the system respectively the control software with the manifold content, which is expandable in a flexible manner, and with the possible cooperation is enormous and exceeds the one of a music CD by far.

According to another preferred embodiment of the present disclosure an action means embodied as a purchase means provides the network address, encryption and/or permission necessary for a successful purchase with one of the further server devices of artist-related analog or digital goods and services.

Distribution partners may be also involved due to the inventive design of the system respectively the control program. Preferably, each server device is assigned to one or more distribution partners. The distribution partners can thereby offer particular preferably identical, similar or completely different goods and services over the various action means.

This new way of distribution of digital media, particularly music distribution, offers the artists and record labels the best way to take the needs and interests of their fans into account with a variety of contents integrated in the system respectively the control program, in particular an app.

In times of constantly rising sales of mobile devices, such as tablet PCs, laptops and smartphones, the rapid expansion of mobile network and always ongoing modernization of smartphones, the present disclosure thus describes a new way, especially for music distribution. It is no longer enough for music lovers to just keep a plastic case with a silver CD and a booklet printed on paper as a "music album" in the hand. With the inventive system respectively control program additional value is created which has not been reached to date by a medium, especially for music and/or videos. A system respectively control program focused on play back of music can preferably include inter alia a complete music album, an interactive booklet, animated lyrics, videos, interviews, wallpapers, lotteries, social media activities and/or combinations thereof, etc. These contents are preferably individually, target group specific and ad infinitum extendable.

An action means designed as a communication means causes according to a further preferred embodiment of the present disclosure a data exchange with one of the other server devices between an end-user-device operating operator and a communication platform for posting articles or for data exchange with at least one further end-user-device, in particular mobile end-user-device, also equipped with an inventive system respectively control program, in particular according to claim 9 or 10.

The operator receives because of the return channel capability of the supported devices (such as smartphones, PCs, tablet PCs) in an advantageous way a new way of interaction, particularly in the form of shopping links, artist chats, social media links and/or followers, etc. The operator obtained because of the system respectively the control program in an advantageous way a direct path to an artist respectively group of artists.

Individual or all action means or individual or all sub means of an action means are in a further preferred embodiment of the present disclosure displayable with an optical output means of the end-user-device in a display format beneath other means, such as the treatment means.

The action means may preferably be arranged respectively arrangeable in list form, tile shape, folder shape, icon shape and/or any other desired optical display variant at fixedly predetermined or at freely by the operator selectable positions of one for the optical output used screen of the end-user-device. The number of action means is preferably determined by the system respectively the control program or the server device for each system respectively control program or for several systems respectively control programs at least differing in view of the artist, wherein it is also conceivable that the number of the action means and/or the content output by the action means is expandable and/or reducible.

This can e.g., specifically mean that in a system or control program action means are provided in the form of an information means for pre-holding concert information, a purchase means for purchasing merchandise products and/or a documentation means for pre-holding of biographies. It is now conceivable, that for example the purchase means will be deleted by the operator, as the operator has no interest in merchandising products, however adds to the information means or as an independent action means e.g., a photo album or song text archive. The photo album or song text archive may preferably be provided through the server device.

With the inventive system and control program is especially for the right holders the new way to distribute digital media controlled and safe in an advantageous manner obtained and due to the interaction modules and action means, such as the communication means or the purchase means, it is possible to be closer to the fan/customer respectively the operator. Thus, the companies operating in these sectors can more precisely consider the needs of the target groups and put together respectively make up and offer more focused products and product bundles.

According to another preferred embodiment of the present disclosure unencrypted data sets include digital media in the form of texts and the texts can be output by means of the optical output means of the end-user-device, wherein while simultaneous output of preferably temporarily encrypted data sets, such as music files, multiple text components of texts pre-hold in the unencrypted data sets can be briefly optically emphasized depending on the output of the temporarily encrypted data.

This means for the user a beneficial extension of its previously known and habitual consumerism. Similarly as before at a music CD or a video DVD the user receives all the opportunities to consume the content (music or video) as well as the bonus material. New features, such as e.g., automatically rendering of deposited lyrics like a karaoke system generate a better understanding of music and/or due to the effect of the resulting high entertainment value a strong customer loyalty of the operators.

Further, the control means loads for a comparison of the authorization data in accordance with a further preferred embodiment at least data to the operator and to the end-user-device from a memory means and transmits these data to the server means. The server device transmits in response to the matching request either an error message and the control means causes that an input field for inputting authorization data is displayed to the operator and repeats the comparison after the operator has confirmed the input data, or the server device sends the decryption key to the control means when predetermined requirements are met, whereby at least a portion of the encrypted data stored in the storage means is decryptable and renderable.

This embodiment is advantageous because the system respectively the control program allows by means of the control means an assignment of the authorization data. The authorization data can be operator-specifically and/or device-specifically designed. In the case of only operator-specific data a privilege is regardless of the device and thus preferred dependent on operator data only, such as a user name, user password, etc. In the case of device-specific authorization data only, the use of the inventive system respectively control program is independent of operator-specific data and thus bound to the end-user-device or the respective end-user-device software. In case of combined person-specific data and device-specific data an activation of the system or a utilization of the system only takes place at certain end-user-devices and/or only on a certain number of end-user-devices and in due consideration of operator data, such as a user name and/or a user password, etc.

The present disclosure is further directed to a method for rendering digital media, especially in the form of a music album assignable digital music files, on an end-user-device. The inventive method preferably comprises at least the step of storing the digital media in a data memory of the end-user-device by means of a storage means, wherein at least a portion of the digital media is temporarily encrypted and unencrypted at least partially acoustically output by means of the end-user-device, the step of comparing authorization data with data pre-hold on a server device by means of a control means, wherein said control means transmits the authorization data via a transmission device of the end-user-device to the server device, and wherein after the comparison of the authorization data a decryption key transmitted from the server device for decrypting of at least parts of the encrypted digital media stored by the storing means is processable by said control means and the step of preparing and at least acoustically outputting of the digital media decrypted by means of the decryption key via speaker means actuatable by the end-user-device by means of a treating means.

According to a preferred embodiment of the present disclosure the control means loads for comparing the authorization data at least data to the operator and to the end-user-device from a memory means and transmits that data to the server means. The server device transmits in response to the matching request either an error message and the control means causes that an input field for inputting authorization data is displayed to the operator and repeats the comparison after the operator has confirmed said input data, or the server device sends the decryption key to the control means when predetermined requirements are met, whereby at least a portion of the encrypted data stored in the storage means will be decrypted and rendered.

The present disclosure further relates to an end-user-device for storing and executing the described control program according to the disclosure, in particular according to one of the claims 1 to 15. A plurality of control programs according to the disclosure, in particular according to one of claims 1 to 15, are preferably storable and executable on the end-user-device respectively loadable to the end-user-device, in particular downloadable from a server device. This has the advantage that the operator can pre-hold a variety of inventive systems respectively control programs equipped with digital media to various artists and/or groups of artists executable on the end-user-device. Preferably a system respectively control program is designed as a master instance, in particular as a control program with respect to a first artist, and the remaining control programs are designed as slave instances, in particular as control programs regarding other artists, wherein the digital media associated to the slave instances is at least temporarily accessible by the master instance. Preferably the slave instances are selectable respectively controllable in such a way from the master instance that their digital media are executable in the same way from the master instance as the digital media of the master instance.

Alternatively or additionally it is nevertheless also conceivable that a plurality of control programs according to the disclosure are pre-held on the end-user-device, which are independently controllable, storable, executable, expandable, deleteable and/or upgradeable.

The disclosure thus relates in particular to a system in combination with a digital rights management (DRM) system for the provision of multimedia files in an application/app respectively a method for secure playback of multimedia files and to a methods for outputting multimedia files, wherein a variety of functional processes coupled with the method for secure playback of multimedia files respectively a plurality of interactive possibilities is provided linked to the system, wherein a method for play back multimedia files, a method to integrate a booklet with interactive content and/or an integrated extensible native user interface that facilitates the handling of the application can be provided, wherein the user interface preferably comprises: fields for bonus material, fields for multimedia content, fields for lotteries in cooperation with partners, access to all social activities, fields for interviews as video content or text form, fields for an overview of concerts, access to newspapers and magazines and/or a selection menu within the user interface of the application, which can be expanded and/or combinations thereof.

Preferably a multimedia file is a music piece, a music video or a movie respectively pre-holds such a digital medium. It is also conceivable that the number of multimedia files is stepless expandable as well as the type of multimedia files. The files are preferably, especially the multimedia files, as stream renderable, especially the multimedia contents are streamable via a server device. The files or multimedia files are preferably also provided as an in-app bonus and are particularly preferred provideable by partners.

Further, a system according to the disclosure preferably includes graphical material in digital form, wherein the graphic material can be photographs in digital form, which for example are pre-hold or displayed in a static or interactive "Booklet", wherein it is additionally or alternatively conceivable that these photo files can also be displayed in a photo gallery of the application and/or can be displayed in a light box with a back and forth control.

It is also possible that the images can be shared and distributed by the native user interface between the fans and the users, especially the images are also or additionally used by the internal system programming as a desktop background or wallpaper.

According to another preferred embodiment of the present disclosure the system according to the disclosure includes a booklet, in which photos are shown, lyrics are incorporated, which are preferred readable along and/or credit information is stored to record labels, photographers and/or designers and that preferentially can be extended with any content. For the purposes of the disclosure the booklet may also be termed as a look-book. It is also conceivable that the lyrics are displayed as animated lyrics and/or are displayed in parallel to the music, especially at the same time. The booklet preferably may comprise content such as advertising collaborations, news feeds, information, stories, magazine- and journal-access and/or shopping offers. A booklet can preferably also provide further links to web pages outside of the application.

The system according to the disclosure includes a native or app-intern player respectively a processing means for outputting at least audible signals and preferably for the acoustic output of songs. Such a treatment means preferably causes play back, fast-forward and rewind and/or volume control and/or a stop & pause function. Furthermore, the system takes over any "normal" media player functions such as play, pause, mute, unmute, skip, next media item, prev. media item, shuffle, for the current album, shuffle through several albums and systems (if several app albums or systems are installed) and/or the selection of a particular media items. A treatment means may preferably additionally or alternatively also play video files with the same functionality.

According to another preferred embodiment of the present disclosure music videos can be provided within the application, wherein these preferably can be streamed via external server.

According to another preferred embodiment of the present disclosure, the system preferably contains bonus material, the bonus material may particular preferably include wallpapers, lotteries, vouchers, voucher campaigns, shopping guides to relevant shops and/or concert tickets and can be easily extended.

According to another preferred embodiment of the present disclosure, the system includes a native user interface with communication capabilities for users registered with the system respectively users that are logged in, wherein preferred real-time microblogging by telegram-like text messages is possible. Further, it is conceivable that the system comprises an own social platform, on which a profile can be created, and by means of which the operators of the system can communicate with each other.

According to another preferred embodiment of the present disclosure, the system includes a "media safe", in particular a storage medium, i.e., a container for digital media files encrypted by the Advanced Encryption Standard (AES algorithm) or similar process, so that the therein respectively therewith stored content data is not readable and usable. The methodology preferably includes requesting from a server device respectively from a highly available application servers on the basis of e.g., a user ID, device ID and/or media safe/album app/system ID a key to unlock the media safe. Furthermore it is conceivable that the system comprises a method for the application of the requested key and thus to unlock the "media safe" and thus for consummation of the content, wherein the system preferably does not known the "media safe"-key and particular preferably never stores it on the device. The system preferably includes methods, procedures or routines for handling common encryption methods, such as Advanced Encryption Standard (AES algorithm), with different and variable key sizes, such as 128, 192, 256, 512 bits.

According to another preferred embodiment of the present disclosure, the system further comprises methods, processes or routines for communicating with a server device, in particular to communicate with the app album server system. The system preferably includes functions for registration, new registration and/or account management of the user account with respect to at least one supplier, especially with respect to the system respectively app store supplier. Thus, the system can communicate encrypted and/or unencrypted with the server device and the appalbum server through standard network protocols (http, https).

According to another preferred embodiment of the present disclosure, the system comprises methods, procedures or routines by means of which a plurality of app albums respectively several systems according to the disclosure can be managed on an end-user-device. In addition, for each system respectively app album preferably a shortcut with a deep link can be created on the desktop, each "media safe" can be decrypted individually, a parent media index can be created and/or media can be made playable via index.

Furthermore, it is conceivable that the system can be extended to any type of multimedia content, wherein it preferably does not require any particular rule to expand the user interface and the system.

According to another preferred embodiment of the present disclosure, a further or alternative action means is preferably designed as a live stream means. This live stream means preferably provides online access to events taking place respectively running live like e.g., press conferences, concerts, opera, theater, and/or public appearances. The live stream means preferably comprises links to the artist/artists, whose music files are pre-hold in the inventive system, allowing a connection to an event. Preferably, the live stream means provides also data, such as the duration, start time and/or the location of the event by means of which the event time can preferably be tracked. Furthermore, it is also conceivable that the event can be viewed in real time and/or time-displaced. Furthermore, it is conceivable that the transmission of the event is storable on the end-user-device by means of the live stream means. The live stream means can be preferably coupled to the purchase means or comprises its own function for purchasing the stored event data. It is also or alternatively possible that the live stream of an event is billable or payable by the purchase means or the live stream means.

Additional advantages, objects and features of the present disclosure will be explained with reference to the following description of the enclosed drawings, in which are exemplarily illustrated systems, methods and devices for playback of digital media according to the disclosure. Components, procedural steps and system components according to the disclosure, which correspond in the figures at least substantially in view of their function can be identified with the same reference numerals, wherein these components, procedural steps and system components do not need to be numbered or explained in all of the figures.

DETAILED DESCRIPTION

Figures 1A, 1B:
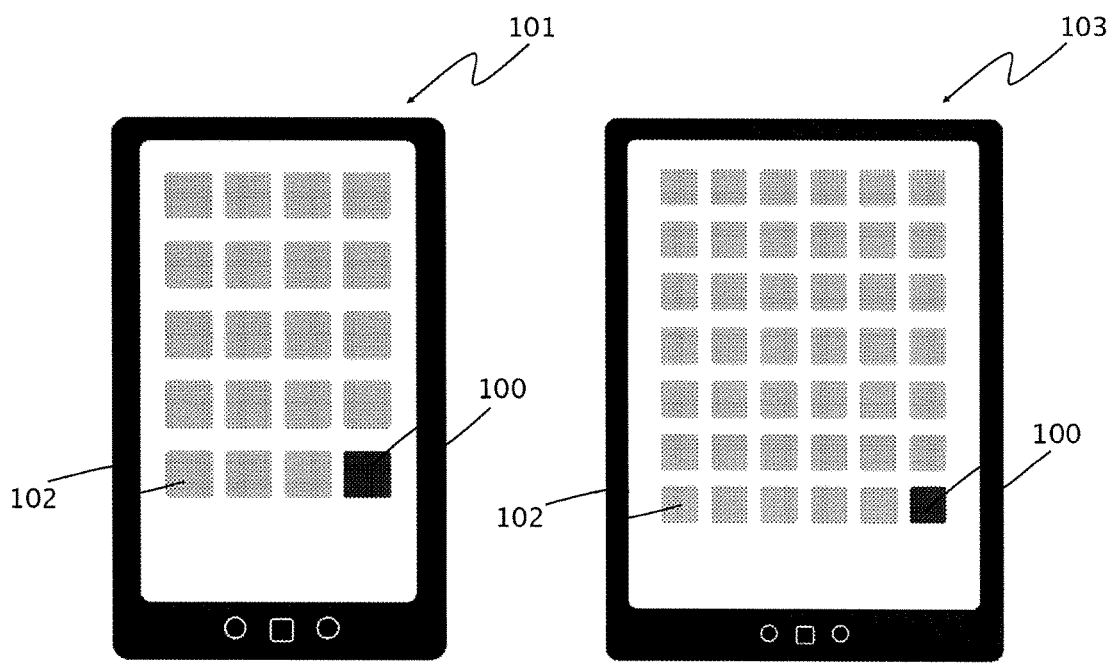
FIG. 1a shows a first output device.
FIG. 1b shows a second output device.

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In FIGS. 1a to 2b various devices for storing and executing the inventive system 100 respectively control program are presented. The app album 100 can thus be installed and operated on different devices, such as a smart phone 101 (cf. FIG. 1a), a tablet computer 103 (cf. FIG. 1b), a television 104 (cf. FIG. 2a), an app album player 105 (cf. FIG. 2b) as well as on all other system-enabled respectively app album-enabled output devices.

It is conceivable and desirable that in the future app album-enabled output devices will be developed, such as an app album player that is suitable like a CD player or TV to run the system 100.

A symbol representing the system of the disclosure 100, in particular an icon, is arrangeable with other applications 102 on the surface of the respective output device, for example 101, 103, 104 (cf. FIGS. 1a-2b).

FIG. 1a shows a schematic view of an output device (smartphone) 103 with different applications 102 and an inventive system 100 (black highlighted) according to the principles of the disclosure.

In FIG. 1b are shown a schematic view of an output device (tablet computer) with different applications, and an app album (shown in black) according to the principles of the disclosure.

Figure 2A:
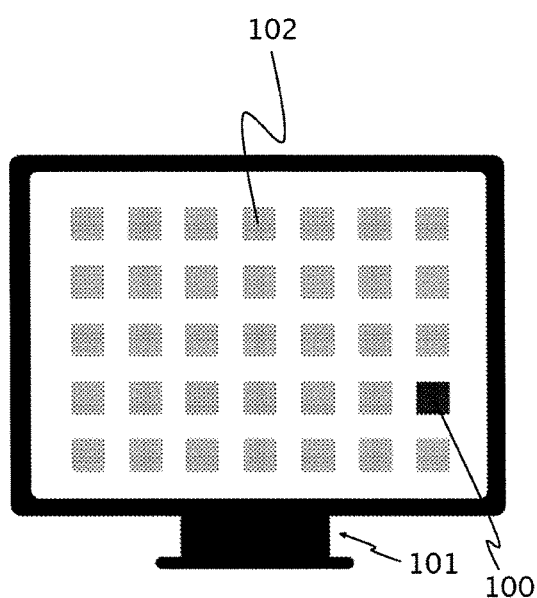
FIG. 2a shows a third output device.

FIG. 2a shows a schematic view of an output device (television) with different applications 102 and a system of the disclosure 100 respectively an app album (black highlighted) according to the principles of the disclosure.

Figure 2B:
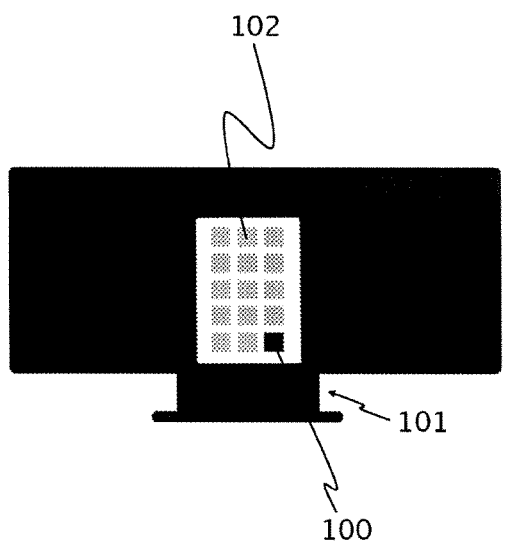
FIG. 2b shows a fourth output device.

FIG. 2b shows a schematic view of an output device (app album player) with different applications 102 and a system of the disclosure 100 (black highlighted) according to the principles of the disclosure.

Figure 3A:
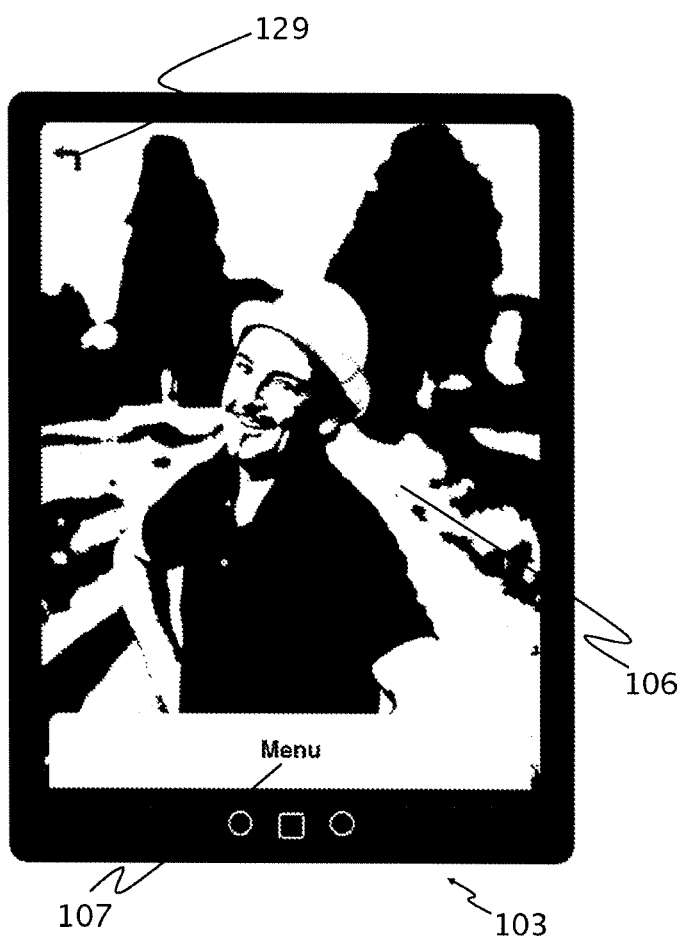
FIG. 3a shows an example of a start screen according to the inventive system.

In FIG. 3a an initial screen of the opened system of the disclosure is shown, showing a cover 106. The user respectively the operator starts the system 100 according to the disclosure on the output device 103, 104, 105, or all of the other output devices, which preferably causes a start-up screen to be displayed respectively to appear, which for example shows the cover 106 of the app album. It has to be understood that the home screen does not necessarily have to be a cover 106, but also other image, text or movie material can be displayed.

Figure 3B:
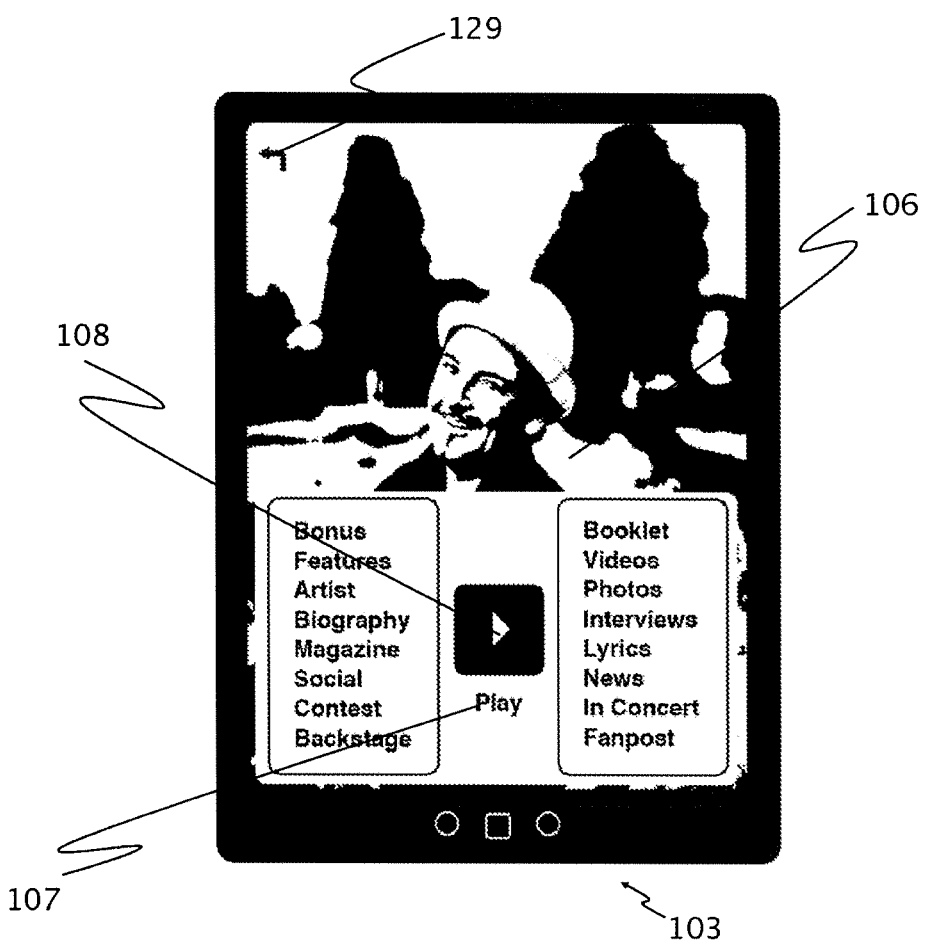
FIG. 3b shows an example of a user interface according to the inventive system.

FIG. 3b shows a home screen with a preferred user interface and a selection menu. The selection menu shows preferably different action means by means of which various functionalities of the inventive system are controllable.

The main menu 107 is preferably located on the start screen 106. The main menu 107 is preferably locatable on any area of the start screen. It is herewith conceivable that the main menu 107 can be freely customized and for example structured in list form and/or tile form. Action means preferably specified through the main menu 107 in the form of labels are preferably free arrangeable, supplementable, changable and/or removable, thereby with respect to the design of the main menu 107 no particular rule is required. By invoking the inventive system preferably entire surface 108 of the menu appears which preferably can be extended by any point. The number of categories is preferably not fixed, wherein it is conceivable that for certain variants of embodiment of the inventive system the number of categories can be defined. On the surface of the main menu 108 are preferably the action means arranged and displayed: i.e., an interactive booklet, videos, pictures, interviews, lyrics, news, in Concert as well as the app internal player, the bonus material, features, artist information, biographies, magazine co-operations, social media activities and/or lotteries and/or combinations thereof etc. The number of categories respectively action means is preferably not fixed and may be extended.

Figure 4A:
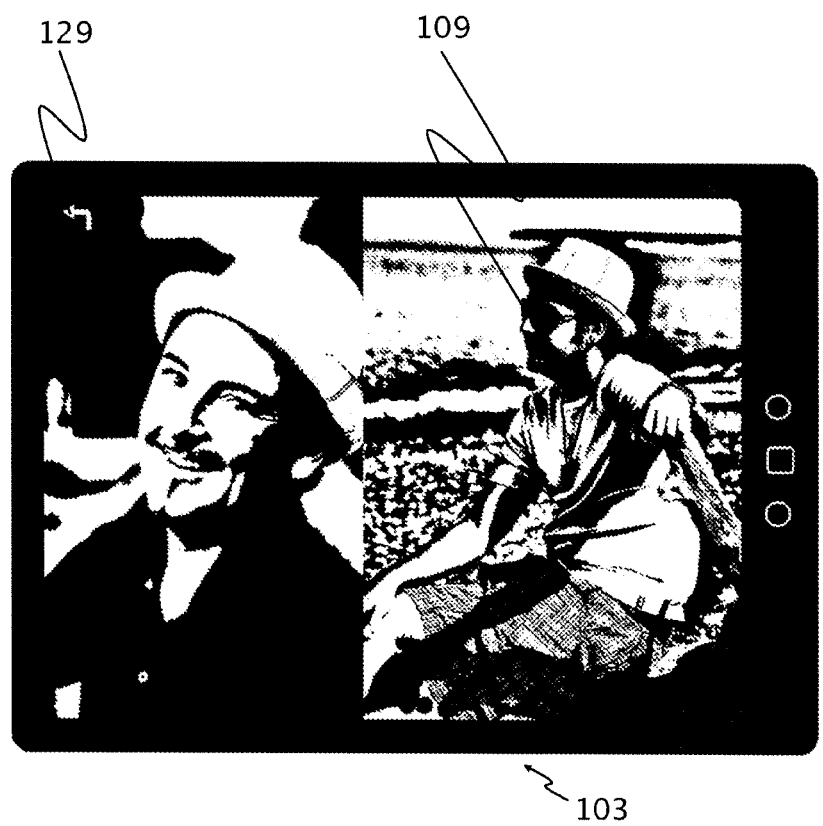
FIG. 4a shows an action means designed as booklet for the display of images.

In FIG. 4a a booklet with images is shown that is preferably browsable by scrolling or wiping.

The user can select the individual category and arrives for instance in the area of interactive booklet 109. The pages of the booklet 109 (that can be also called look book) can be by means of scrolling or wiping (especially smartphones and tablets) selected respectively invoked, and are thus displayed for viewing. An interactive booklet 109 may preferably be consisting of a variety of contents. It can show images as photographs or drawings. It can play back movies and music videos. Through external links cooperation-partner sites can be accessed as well as access to the World Wide Web can be established. Other systems of the disclosure may be purchased respectively bought through in-app purchases. Further, for example mp3 CDs can be purchased on partner sites. The contents of the booklet are therefore particularly preferably not limited.

Figure 4B:
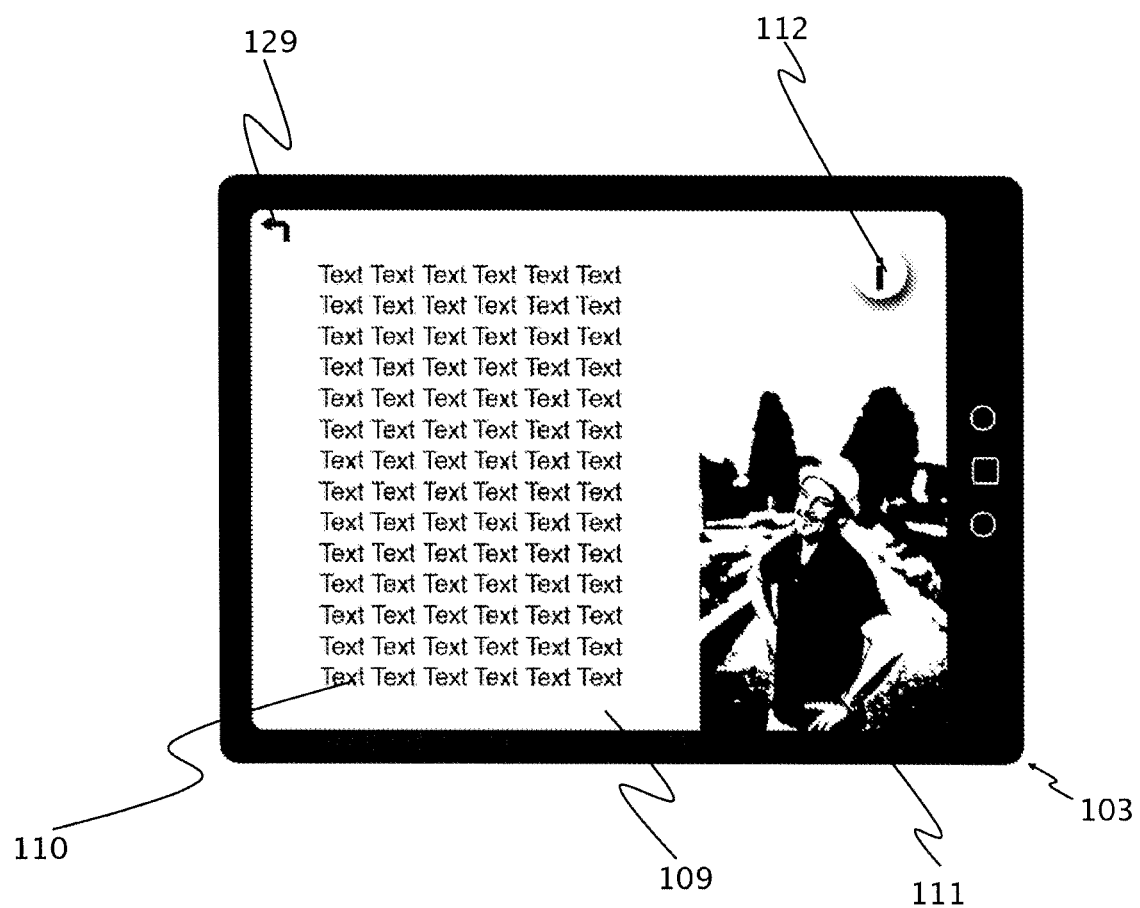
FIG. 4b shows an example of interactive lyrics.

In FIG. 4b an interactive booklet page with lyrics to one song and image material is shown.

To the interactive content of the booklet 109 belongs e.g., an info-link 112, which can show a variety of details after actuation 112-1 (see FIG. 5a), such as: shop offers on external sites by collaboration partners, information, stories and/or news and/or combinations thereof. The number of details is preferably not set. Furthermore, lyrics are preferably displayed, which can be read by scrolling, i.e., its text not displayed is e.g., viewed by scrolling or wiping. Likewise respectively additionally or alternatively social media activities can be included as live view.

Figure 5A:
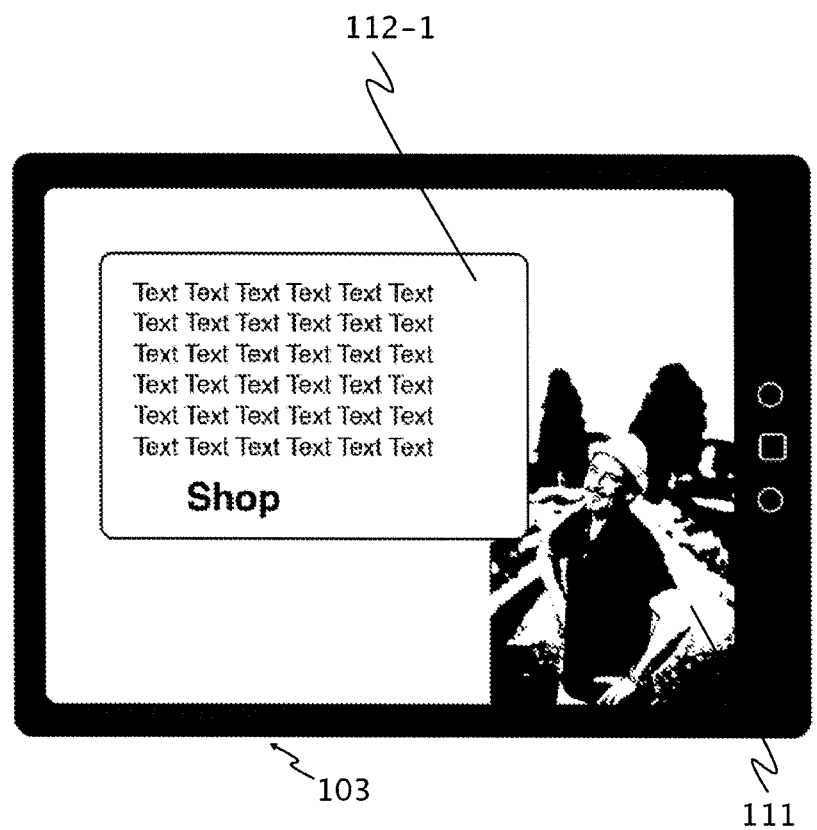
FIG. 5a shows an example of a link, especially a shopping link.

In FIG. 5a a booklet page is shown, in which interactive content is invoked. A linking to an "online shop" can be seen e.g., from the illustration, that generates in dependency to an specific actuation an access to an online shop.

Figure 5B:
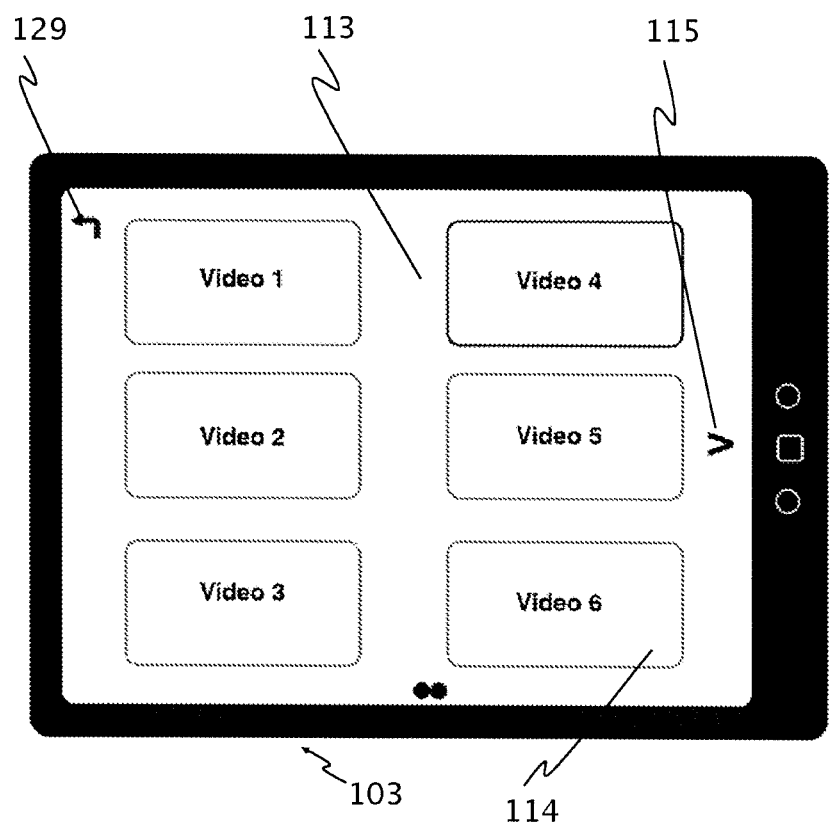
FIG. 5b shows an example of a media outline.

A preferred selection page of the application for videos is shown in FIG. 5b. By a home button 129 one gets preferred any time from any area of the application 100 back to the main menu 107. The arrangement of the button is preferably not defined and particularly preferably freely established. Another area respectively another action means of the application is preferably the video area 113. Music videos, films and/or interviews, 114 may be provided i.e., initially be integrated into the system or be playable by streaming from partner sites. The films are either playable preferred through the app-internal player respectively the native respectively the system-internal processing means or by the players of the partner sites or by a player pre-hold on the end-user-device. Content of film material can preferably be added in an arbitrarily manner by a further navigation 115.

Figure 6A:
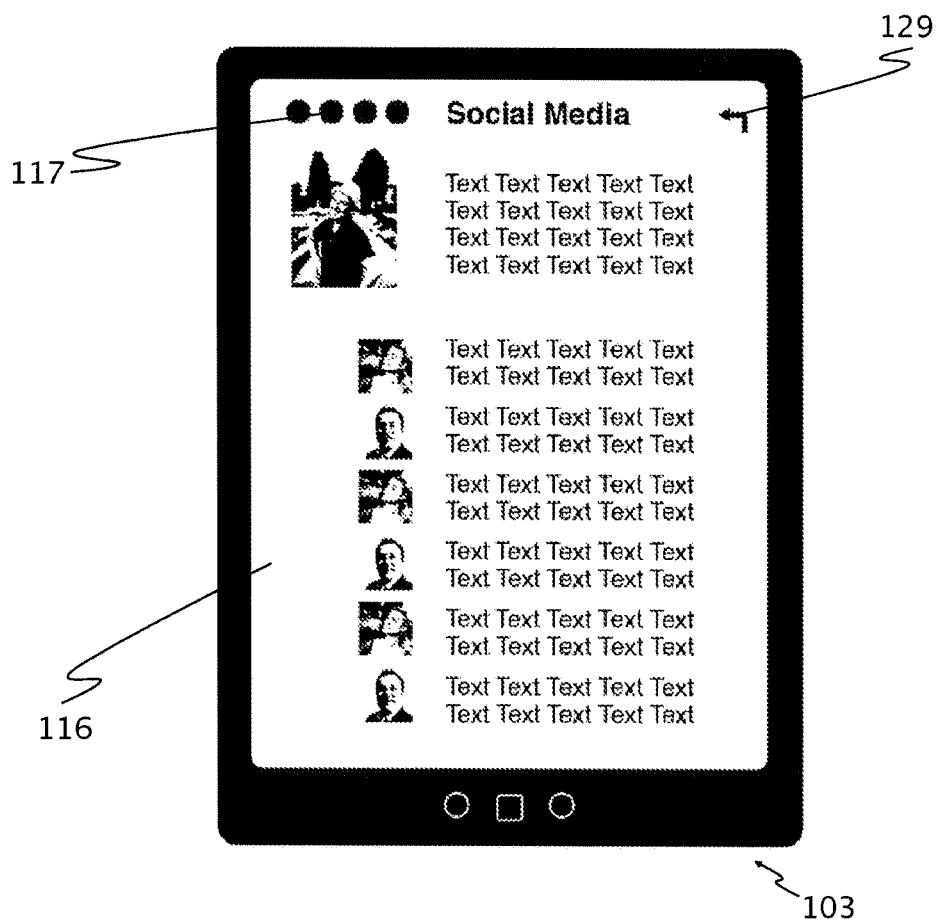
FIG. 6a shows an example of the integration of a social network into the system.

In FIG. 6a a section of the application 100 is shown that is designed to show social media activities. This section is preferably referred to an action means, especially to a communication means. The inventive system 100 contains respectively comprises preferably at least one communication means respectively a social media area 116. This may preferably include access to any or all social media platforms, such as for example enables access to a Facebook profile of the artist and/or the operator. The operator can preferably select other social media platforms with a selection menu 117, and may access them with the right login.

Figure 6B:
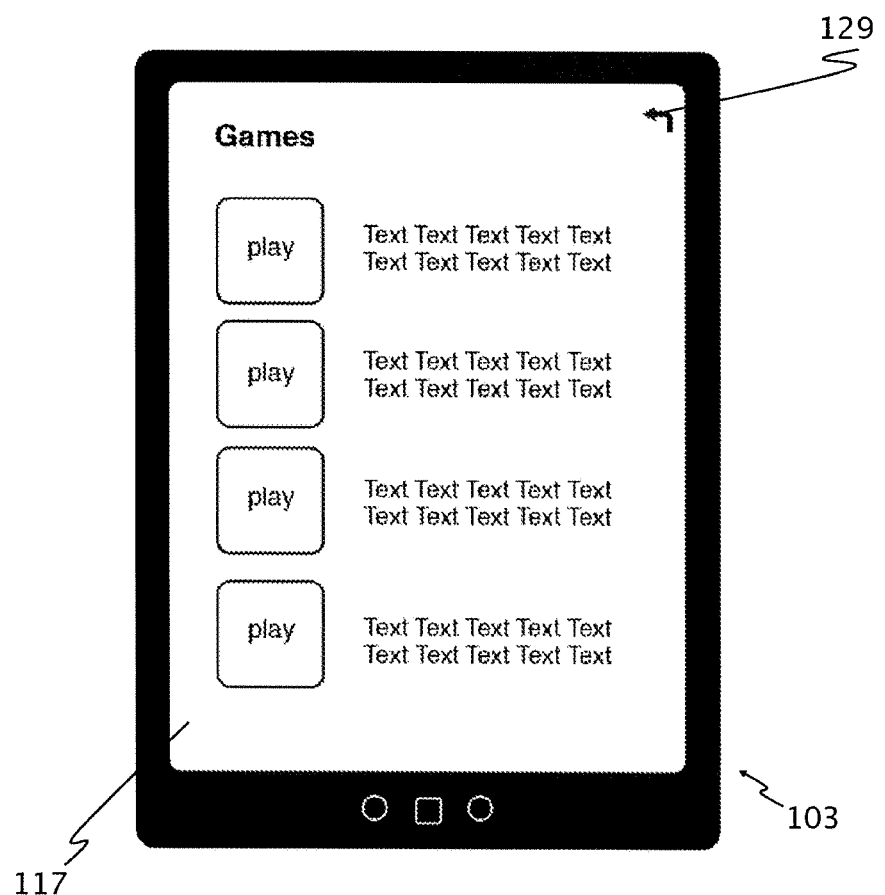
FIG. 6b shows an example of additional features, in particular the provision of games.

In FIG. 6b an example of a selection page for selecting games of the application 100 is shown.

This game section can preferably consist of games of partner companies and/or games specially programmed and configured in relation to the respective specific artist determined by the system. The number of games requires preferably no particular rule. The games or the games list can hereby be termed as action means, particularly as games means.

Figure 7A:
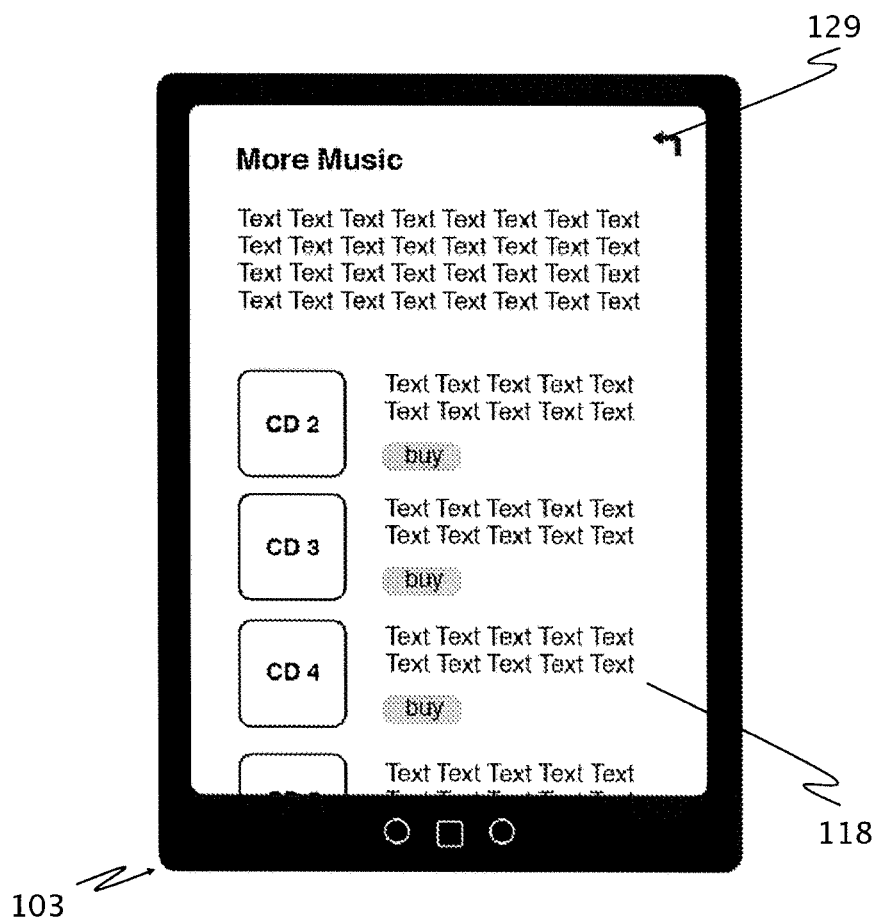
FIG. 7a shows an example for the purchase of digital media through the system, in particular an overview regarding in-app shopping.

FIG. 7a shows a selection section for several inventive systems 100 respectively app albums of an artist, which are preferably purchasable with a purchase means from a app store respectively from a server device directly out of the system and can be preferably directly respectively automatically integrated into the system 100. In order to increase the number of sales of the artist and the revenue of music labels preferably with a specially provided action means, especially a purchase means, respectively a category, a product catalog 118, especially to the artist and/or the music label, is integrated respectively made available. There preferably through further links to partners and/or the music app platform more app albums, CDs, DVDs or music files, especially mp3s, of the artist can be offered. Preferably immediate in-app purchases, i.e., purchasing of digital media through the system, can be handled respectively causes with a payment partner.

Figure 7B:
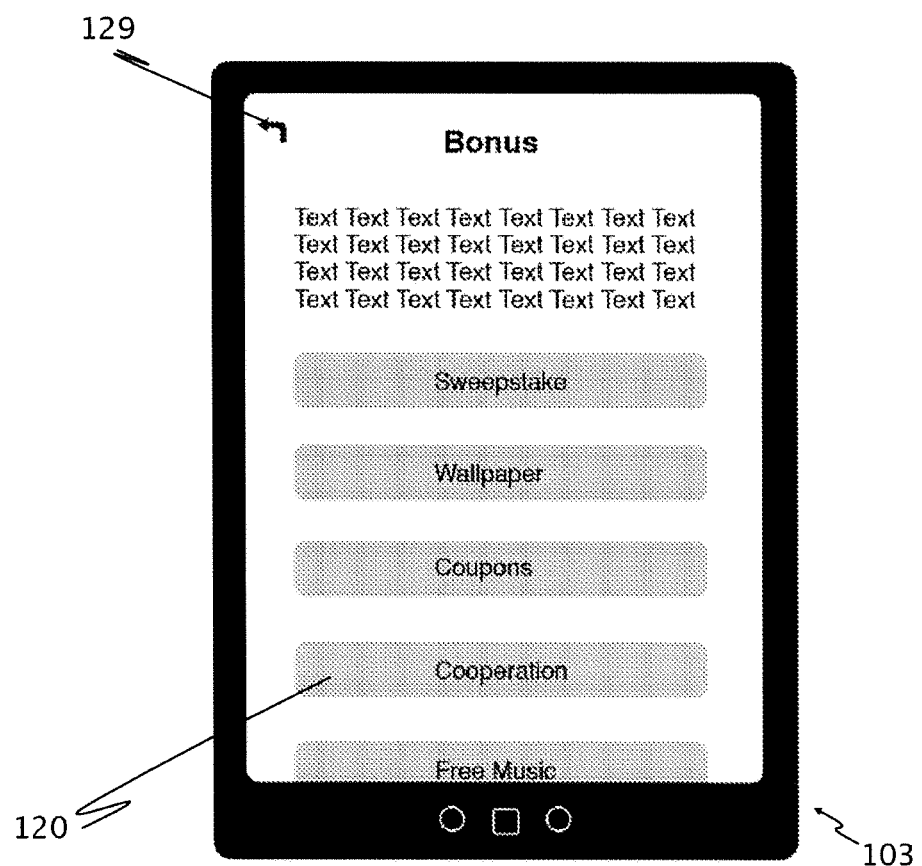
FIG. 7b shows an example of an overview of additional functions respectively action means, especially a list of bonus material.

In FIG. 7b for example a section of bonus material of the application 100 is shown. The inventive system 100 has therefore preferably a further action means, in particular a bonus means, respectively a further category, namely the bonus material 119. There are preferred actions 120, such as contests, coupon offers from partners and/or cooperation and/or combinations thereof, etc. located respectively pre-held. Wallpaper can be provided there too, wherein none section needs a specific control, which means that the individual elements respectively components of the bonus means are preferably located respectively pre-hold in any form and/or arrangement within the application 100 or within the bonus means. Furthermore, it is also conceivable that e.g., with the purchase means also freely available music can be offered or ordered. This category is configured respectively expandable arbitrarily with a system supplier and/or the operators.

Figure 8A:
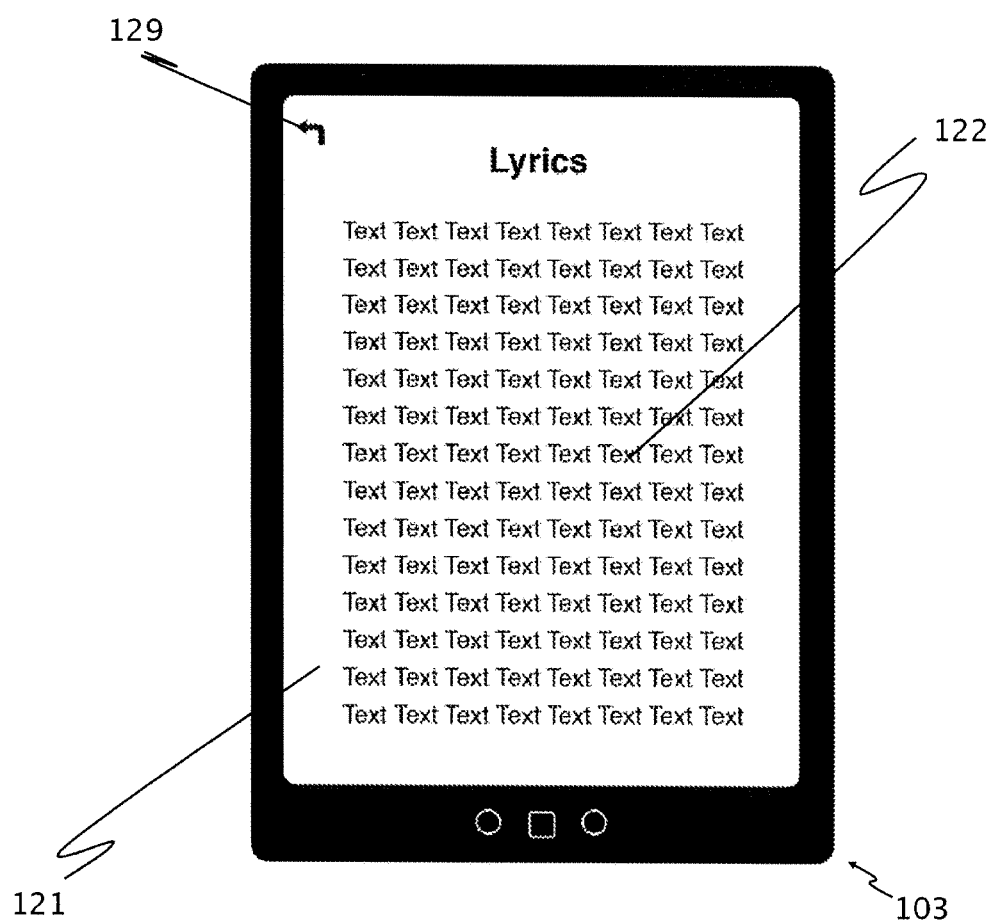
FIG. 8a shows an example of animated lyrics.

In FIG. 8a a section for lyrics with preferably animated text flow is shown, which is currently, i.e., to the correlating text passages of the songs output at the same time by the treatment means, highlighted. The main menu 107 thus preferably includes another category, namely that of lyrics 121. This preferably includes individual and more preferably all lyrics of the songs renderable by the system. Therefore, lyrics can be preferably read and/or displayed as animated lyrics, which are preferably played continuously. Furthermore, the current text passages 122 are highlighted in terms of color and/or by size change. This in particular promotes the effect of karaoke singing.

Figure 8B:
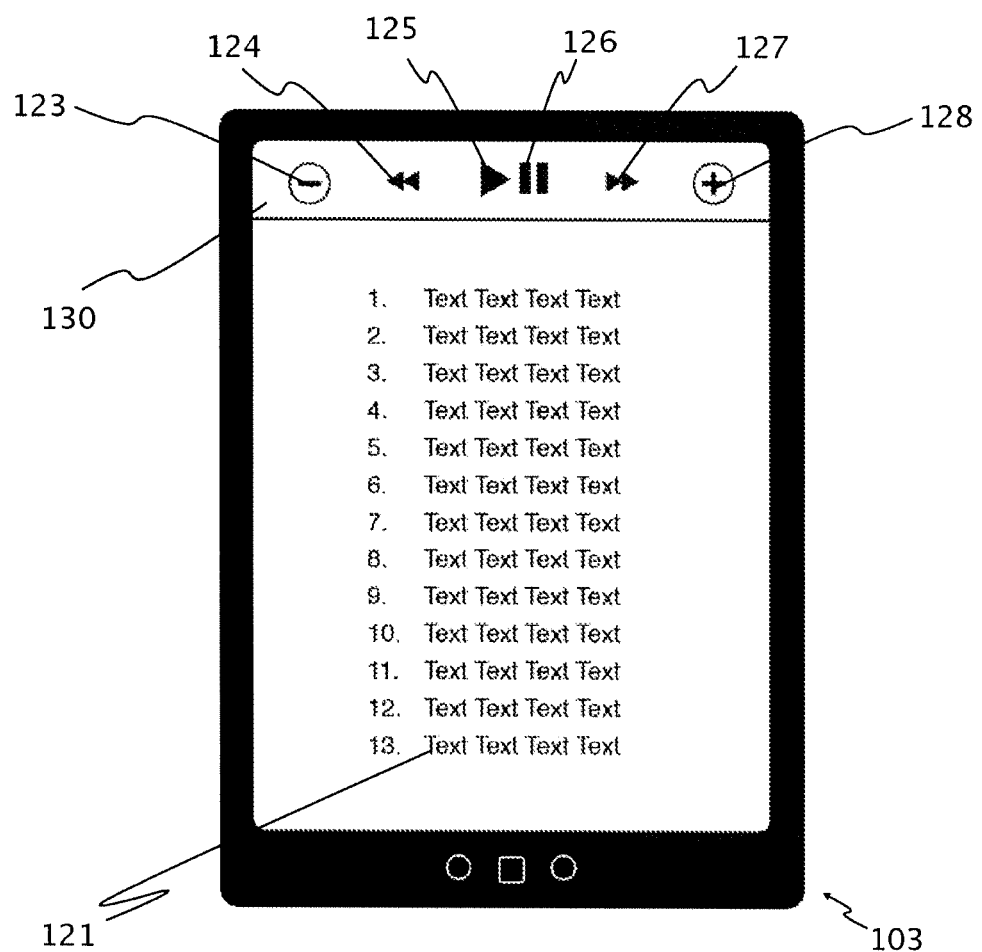
FIG. 8b shows an example of a treatment means, in particular a playback means, for outputting the digital media to an operator.

In FIG. 8b the app-own player is shown with start/stop, forward and rewind, fast forward and fast rewind and volume function. Thus, in FIG. 8b is an important functionality respectively an important section, namely the one of the included songs 122 and/or the app-internal player 130 respectively the processing means of the system, shown. The songs or pieces of music can be preferably played by selection. The songs can be additionally or alternatively played respectively rendered using the treating means for streaming from partner sites. The app-internal player 130 preferably has the following playback functions: start-stop-pause, forward and rewind, fast-forward and fast-rewind, button and/or a volume control. The functions of the processing means 130 can be preferably expanded.

Figure 9A:
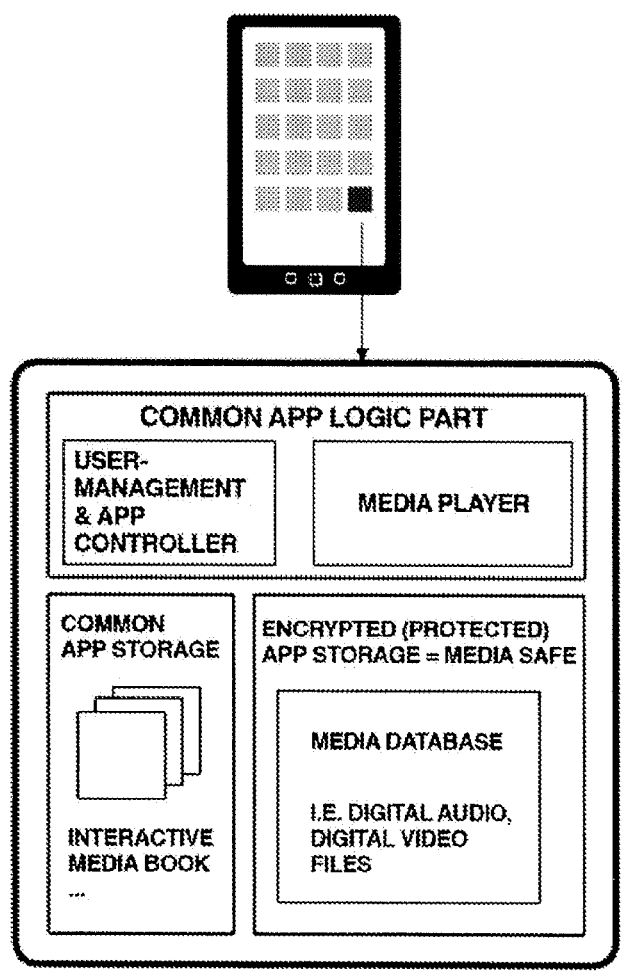
FIG. 9a shows an example of an abstract representation of the system architecture.

In FIG. 9a the technical design of an inventive system 100 is shown. The system preferably represents an application for downloading and/or for distribution and/or for rendering of digital media, especially music files or video files. The digital media are preferably pre-holdable as data-sets and with a processing means of the system preferably in dependency of an authorization processed transferable to an output device of an end-user-device for outputting to a user, in particular a speaker means, with or without a display device coupled therewith. The data sets are preferably at least temporarily encrypted pre-holdable, wherein for the decryption of the data preferably identification data recorded by the system are interchangeable with data pre held on a server device for the authorization. Further, the user identification data preferably include data to the user and/or to the end-user-device and the data pre-hold on the server device preferably comprise user specific profile data.

The inventive system is an application (App) for digital, in particular mobile, end-user-devices, such as computer, television and/or mobile devices, such as laptops, smart TVs, tablets etc., which contains respectively pre-holds in addition to the program logic (for example playing, browsing, sorting of digital media, interacting with content and artists) also the digital media itself (e.g., audio data or video data) preferably in current digital formats. The application itself particular preferably consists of three main modules no. 3, 4, 6 (cf. FIG. 9a). Particularly crucial is the strict separation between logic and data in the data section especially between encrypted and "free" data, i.e., that the present system stores as specified by the rights holder the encrypted digital media in a "media safe" respectively storage means and/or puts them as "free" data in the application structure.

Figure 9B:
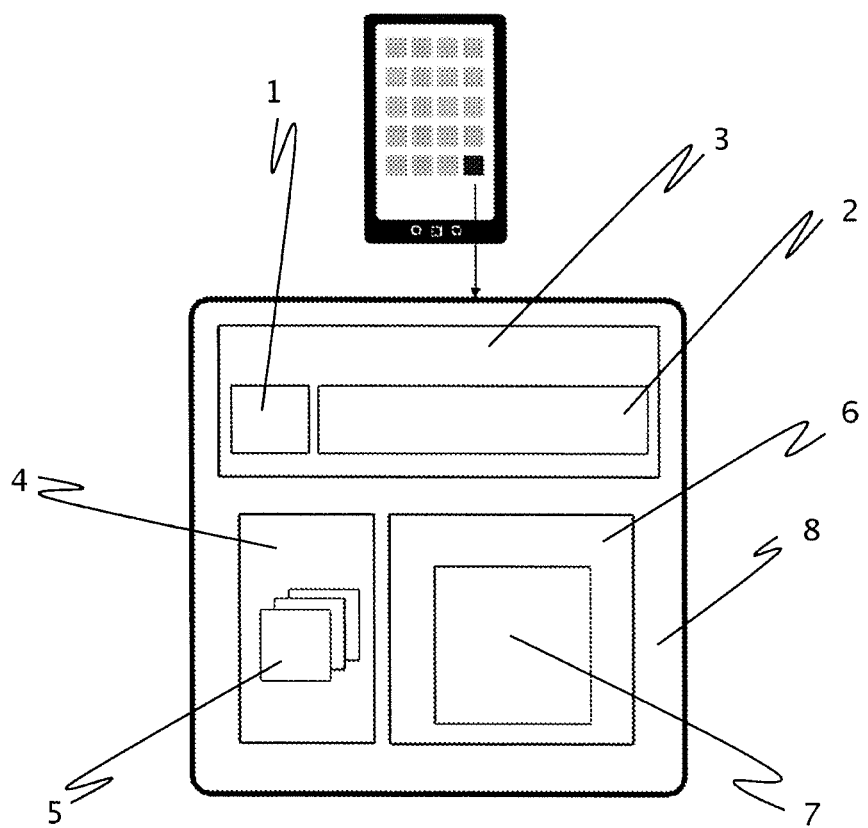
FIG. 9b shows an example of an abstract representation of the system architecture.

In FIG. 9b, the technical program modules are shown again in a more abstract representation. The application 100 is preferably set up of logic and data modules listed below.

Module 1 can be termed as user management and app controller respectively control means. Each user of the app album has preferably at least once to login into the application with a valid system account. The module 1 performs this authentication process and handles the entire rights and program control, i.e., it preferably regulates what, especially which digital content, when, especially in which moment or in which period, by whom, especially by which operator, and/or on which device is allowed to be seen, played and/or opened. Module 1 is preferably also responsible for the network authentication with the app album server system respectively the app album store.

Module 2 may be termed as a media player for app album audio and video formats or as treatment means. This program module preferably includes methodology and/or the decoding method for the "media safe" respectively the storage means and/or the required player and interaction logic for the user. The app album secure media player respectively the treatment means communicates thereby preferably with module 1, it asks in particularly for the necessary password to decrypt the protected data, opens then the content and provides depending on the content type the appropriate functions for a "secure play" (play, pause, stop, shuffle, next item, previous item, and/or slow motion, etc.).

Module 3 can be termed as application logic. In addition to module 1 (User management/control means) and module 2 (secure media player/treatment means) the application 100 preferably includes methods for sorting, filtering and/or representing of content, media and app albums on several parallel installed app albums. Thereby multiple systems respectively app albums can be combined, stored individually and/or treated as well as grouped according to different filter options (e.g., content of an artist, a genre).

In addition, shopping features for purchasing further app album media in an app album store are integrated in the application 100. In the "news" section as well as in the media search deep links to the app album store are provided.

Module 8 may be referred to as a data storage respectively as a storage means. The data memory of the application is preferably divided into two main sections, namely in a "normal" storage place on the file system of the end-user-device and an encrypted section. The encrypted section is preferably a file, particularly a container, that preferably can be opened with a valid password, only and then releases the access to the protected contents.

All data required by the application 100 as well as protected and free media data and also metadata are preferably saved in different directory structures and data modules. General application/user/operating system settings belong thereto, which make up module 4. Per system are preferably free, that is not-protected, media (especially all the metadata about the artist or the work, e.g., images, URLs to videos, texts, twitter messages, etc.) storable respectively pre-holdable in a module 5.

All the protected media content and an index of all app album contents are saved on the system in a file section (module 6) encrypted with AES. In this "media safe" respectively storage means the actual media database (module 7) is preferably located which are the actual media files, such as digital audio or digital video files. These media files can include any codecs, there are no restrictions built in on purpose that preferably the latest, most advanced and/or the best quality audio and video encoding method can be used constantly.

Figure 10A:
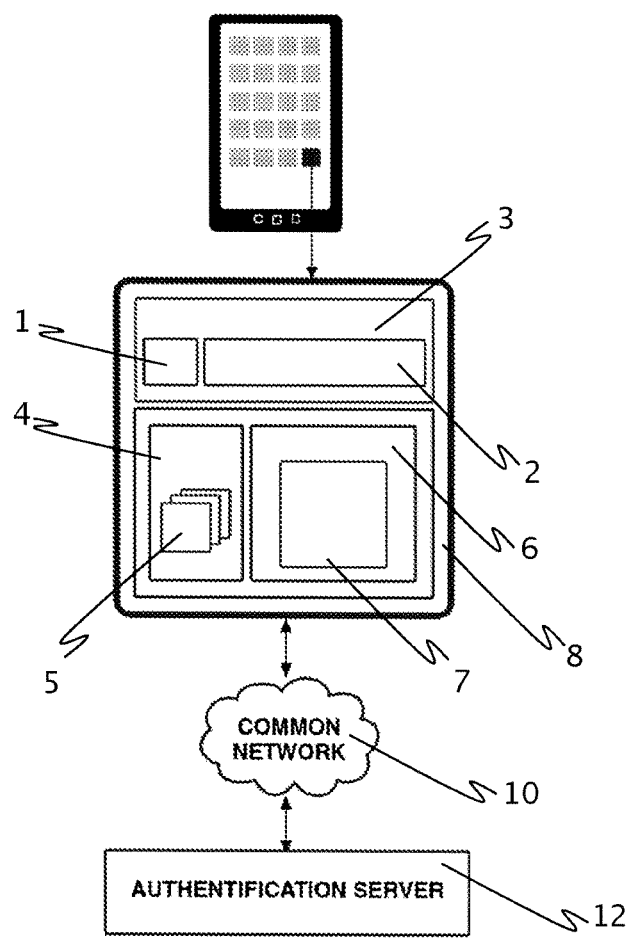
FIG. 10a shows an example of the interaction of end-user-device, system and server device respectively server system.

FIG. 10*a* preferably shows the total workflow, i.e., how an inventive method preferably communicates with a high-availability system over the Internet.

Figure 10B:
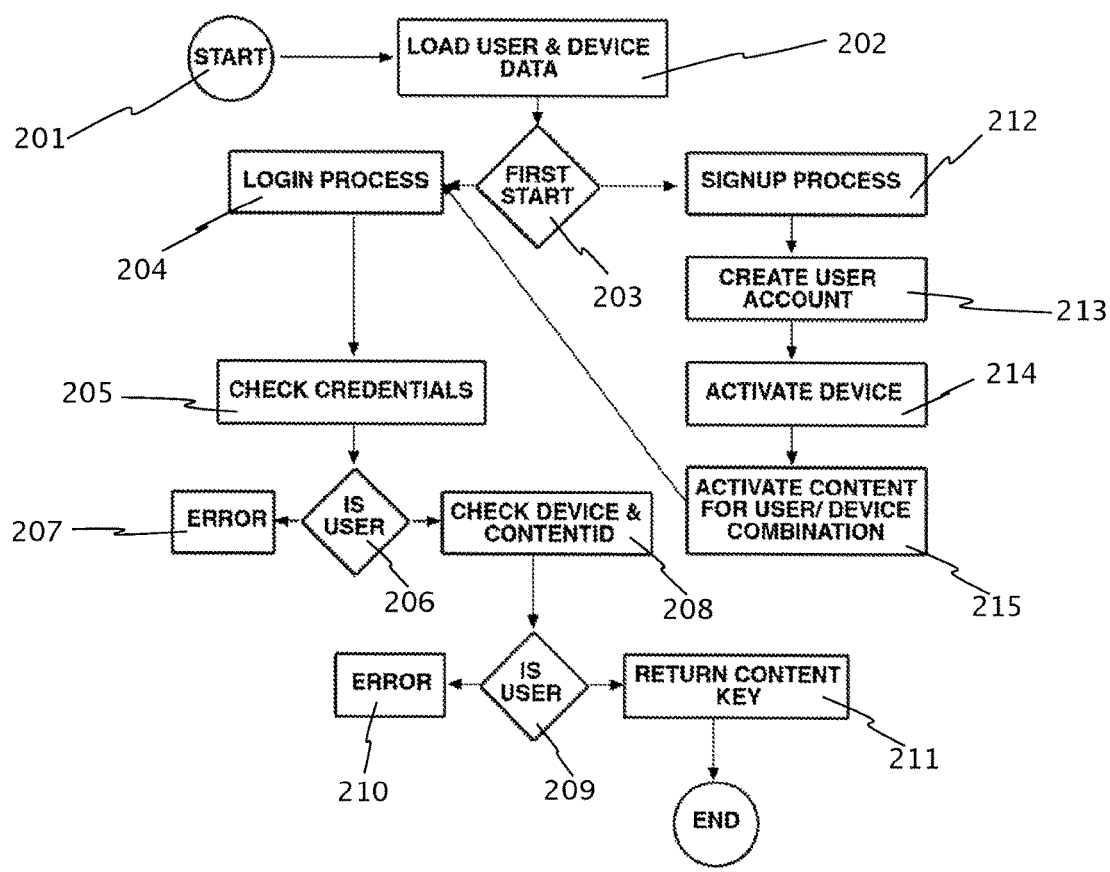
FIG. 10b shows an example of a network process, how it may be possible for the integration of the system in a sales or purchase system.

When starting the application on the end-user-device, the system preferably always tries to connect with the app album server system 12 respectively a server device. A system user account is therefore preferably required. If no account is created, particular preferably a signup process will be immediately started, which can be, for example, illustrated as shown in FIG. 10*b*. If valid user data have already been stored, preferably an encrypted (https) network connection 10 will be opened and the credentials (user name, password, app album IDs and/or players identification) will be checked. Preferably only in case of correct validation of all the details the key required for the decoding of the "media safe" respectively storage means is transmitted from the server device to the system.

In FIG. 10*b* an example of the server-side process is shown, which is run on the album app servers, once an inventive system is started on an end-user-device. This means in detail that the stored user data, in particular an username and/or password and/or the players ID, in particular MAC address of the network card respectively UDID or IMEI in cases of smartphones, will be transmitted 202 at the application 201 start via a data connection to the server device, especially with a preferably https encrypted connection.

The server device checks in a further step 203 the user data and redirects in case of erroneous respectively not yet stored user data, preferably automatically to the signup process 212. In the signup process 212 the user is in particular once requested to enter user data 213, such as an user name, a password, an email address, a bank account and/or an address and/or combinations thereof, etc.

When the user profile is successfully created the currently used end-user-device is activated 214 as a valid end-user-device for performing the inventive system. In the next step the media piece (i.e., the digital media respectively the app album content, such as a music album, a video, etc.) is unlocked 215 for that user and/or the activated end-user-device, wherein preferably several end-user-devices are unlockable. If user data are transmitted 203 during the login attempt or if the signup process has been successfully carried out to 216, the actual login process 204 preferably starts. In the first step, the user data are checked, in particular a login name, a password and/or a device ID, whereby the user and the end-user-device are identified 205.

In case of an erroneous check 206 it is preferably redirected to an error prevention side 207, which particularly preferably provides a password reset, a security question for password recovery and/or similar measures. In case of a successful login preferably the permissions of the user, of the player and/or of the media piece are checked 208.

Figure 11A:
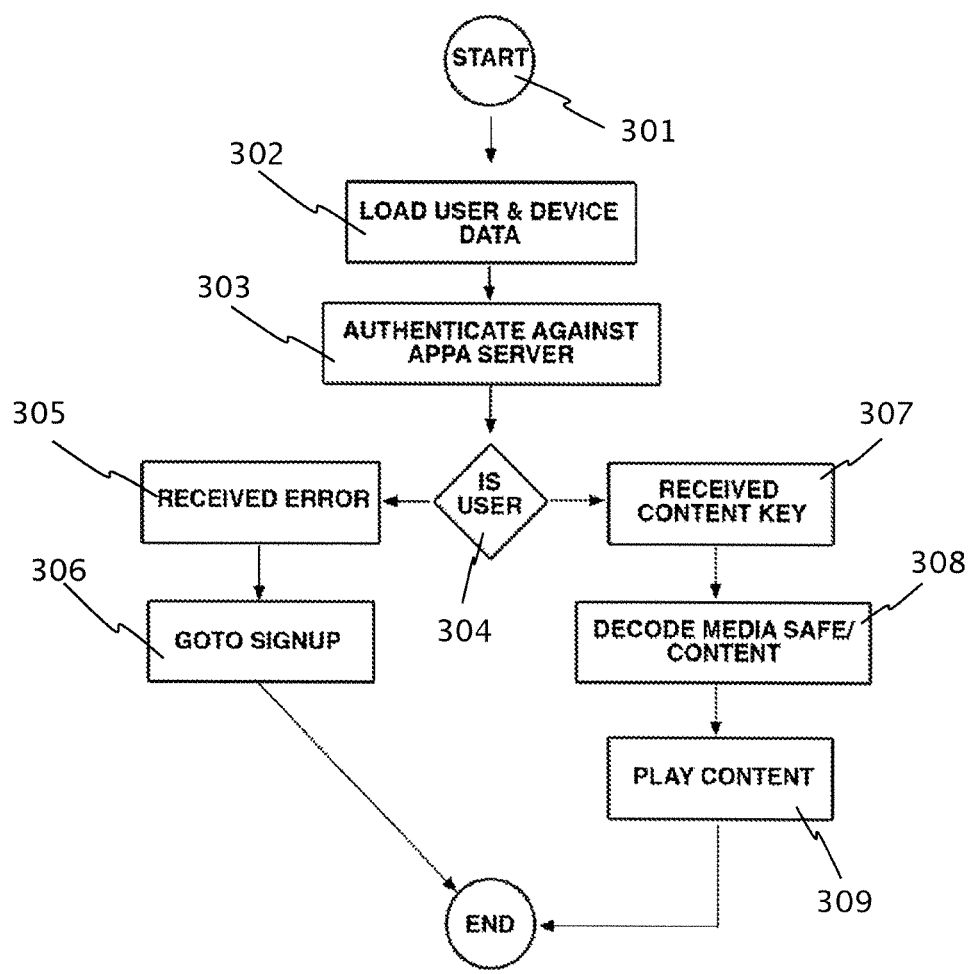
FIG. 11a shows an example of an application and/or registration process, as it can be done in the context of the disclosure.

In FIG. 11*a* an example of a workflow on client-side is illustrated which can be executed at the start of a system of the disclosure within the system or the application.

In case of an unsuccessful verification 209 it will be redirected to an error avoiding page 210 according to the comments to FIG. 10*b*. In case of a successful verification 209, the decryption key will be in contrast transmitted 211 to the inventive system by the server device to decrypt the "media safe" or the storage means provided in the inventive system and the process is particularly preferably continued on client side within the system or the application, i.e., for example within the meaning of the workflow shown in FIG. 11*a*.

The stored user and/or device data is loaded 302 from the local application memory and transmitted 303 to the server means preferably with the start of the application 301. If an error occurs 305 during the registration process the application logic preferably loads the appropriate signup routine 306 with appropriate forms.

After successful authentication 304 the server device preferably transmits 307 the key "content key". With this key the app album media player respectively the processing means is able to decrypt 308 the "media safe" respectively the storage means and to give the included media free 309 for viewing and for use respectively consumption.

After successful decryption of digital media respectively media data the system of the disclosure preferably switches into the player mode (cf. FIG. 8*b*) and provides all the necessary functions, which are required to manage and/or play the digital media files of the "media safe", for example available in different formats and encoded with different audio and/or video codecs (e.g., AAC, MP3, H.264, ogg vorbis, etc.).

Figure 11B:
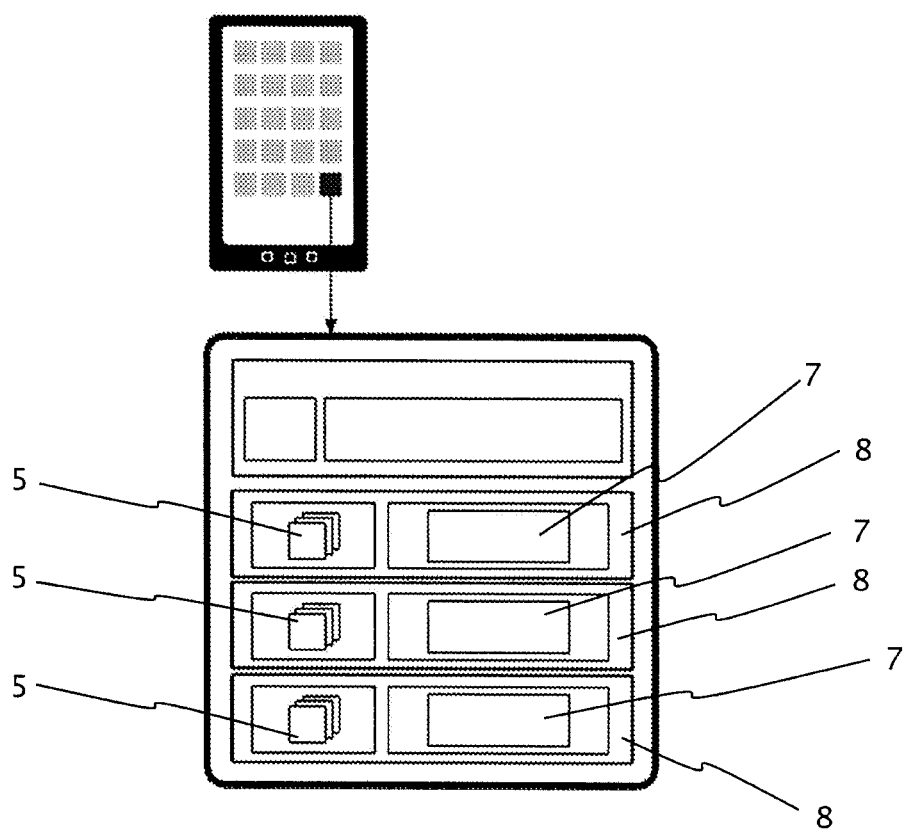
FIG. 11b shows an example of a system management in the presence of multiple systems and/or a plurality of in a system pre-held digital media groups, in particular of different music albums from one artist or several artists.

FIG. 11*b* shows an example of a preferred nesting/bundling of several systems of the disclosure respectively app albums on an end-user-device.

If several systems according to the disclosure are installed on a end-user-device, the system logic respectively application logic preferably uses the advantage of archiving and indexing of encrypted content, i.e., particularly preferably individual independent applications in which the user should always newly authenticate are not created, but the present system preferentially recognizes that it is installed and configures itself as a "virtual CD rack" and preferably provides also an overview and administrative level for all installed music files of the inventive system.

The inventive system preferably includes a method to sort and to represent the content for a better usability. Are e.g., several systems of the disclosure installed, the user preferably can specify in the system settings if each system of the disclosure should appear as a single icon (cf. FIG. 12), if all app albums of an artist are grouped together in one "artist" app album, if all the songs of a particular genre (e.g., "Rock/Pop") and/or if all of the installed media will be displayed in a global app album. According to this setting app album then opens exactly the one or even several albums and preferably offers more than further searching and/or sorting features to allow filtering by artist, albums and/or genres.

Figure 12:
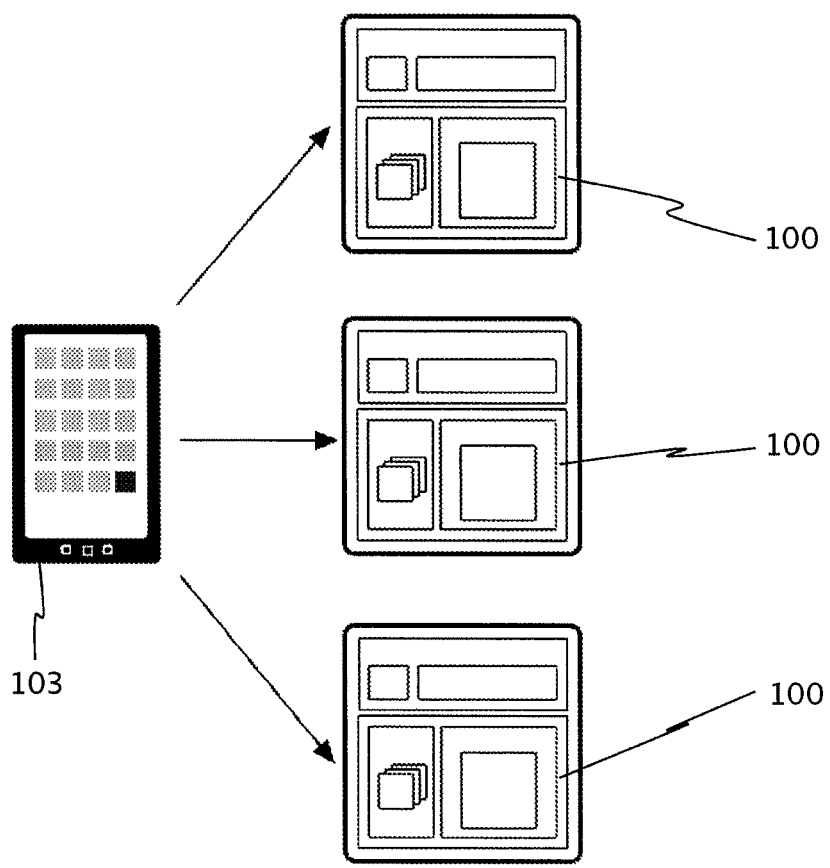
FIG. 12 shows another example of a system management in the presence of multiple systems and/or a plurality of in a system pre-held digital media groups, in particular of different music albums from one artist or several artists.

FIG. 12 shows an example of a schedule according to which a purchase and/or installation process of an inventive system can take place such as a first-time purchase and/or installation process. The purchase of an inventive system and the purchase of digital media, especially music files by means of the inventive system, can be done via different distribution channels of third parties (app stores and web shops other providers) and/or in a own app music store and happens preferably in dependency of the respective shopping operators and particularly preferably always according to a workflow, such as invoked below. The presentation focuses primarily on the distribution of the inventive systems and preferably not on the individual aspects of shopping.

The user opens in the browser of the end-user-device an app album store 402 respectively by unknown suppliers the media section/category and browses through the available products 403. In case of a buying intention he puts them into the shopping cart and goes to checkout 404. Then or before the user authenticates at the shop 405 or registers there as a new user and preferably stores his payment data and approves the purchase.

The user preferably receives the download URL for the corresponding app store and downloads 406 his app album respectively inventive system to the appropriate end-user-device after successful purchase.

During the initial start 407 of the inventive system the user must preferably login once in the system and/or register and/or activate 408 the play back device. Preferably after successful activation the purchased content, especially the music and/or video files, will be automatically downloaded 409 to the end-user-device and is then available in encrypted form to be decrypted and/or for consumption.

Figure 13A:
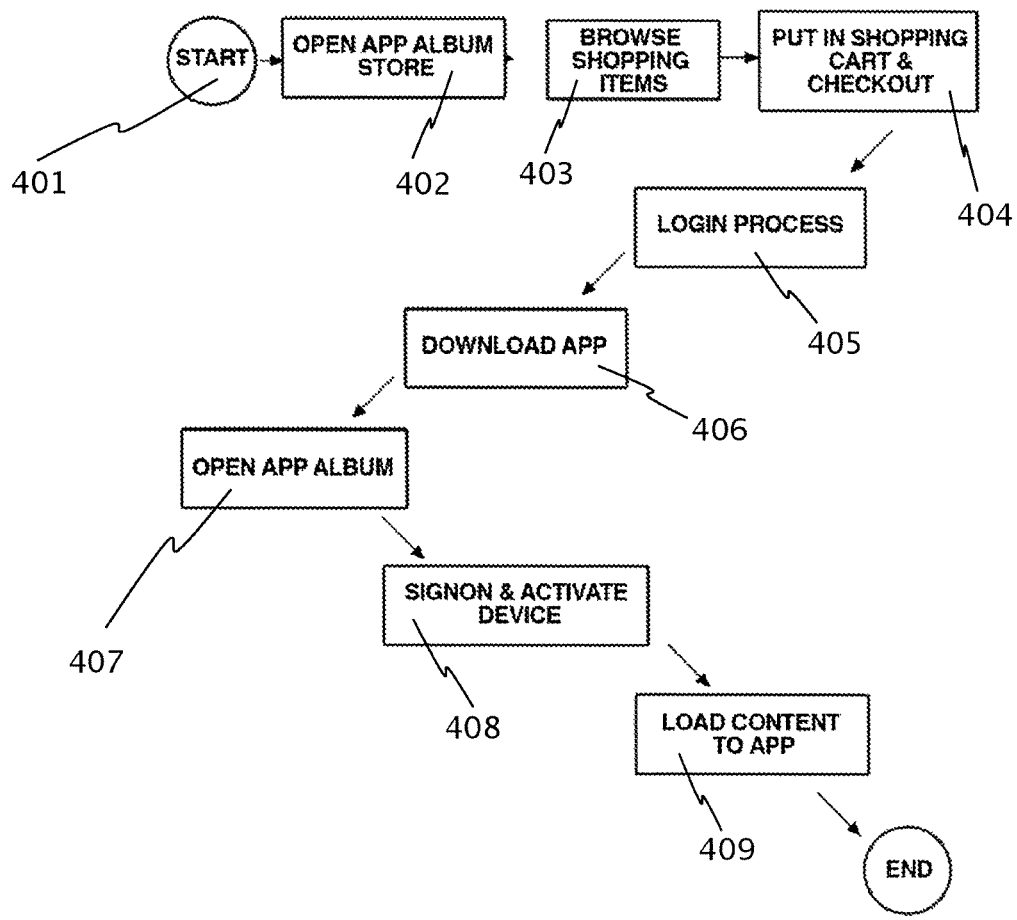
FIG. 13a shows an example of a purchase and/or installation process during receiving the system.
Figure 13B:
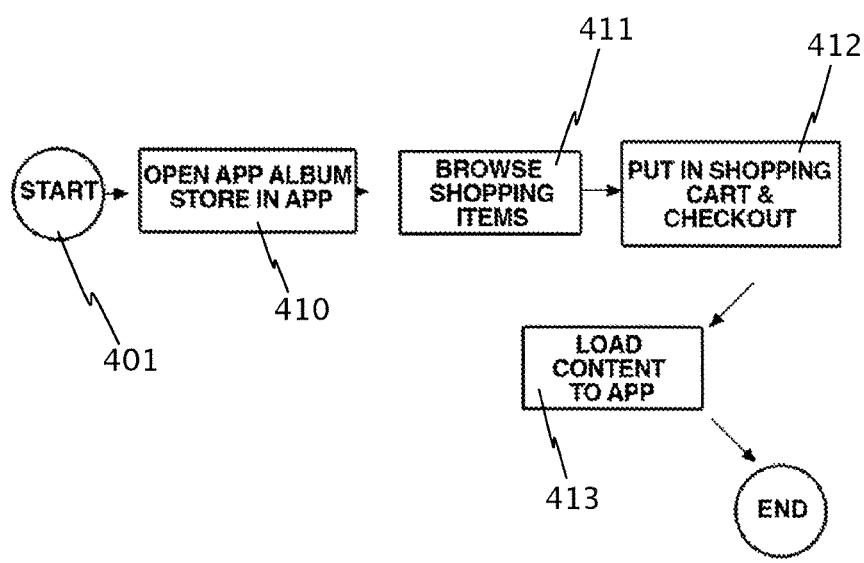
FIG. 13b shows an example of a purchase process during receiving of components of the system, particularly in terms of other music albums of an artist.

FIG. 13b shows an example of the app album media buying process respectively the purchase of music files by means of the inventive system.

In case an app album has been installed jet the process described with respect to FIG. 13a is significantly simplified. The user opens the app album store directly in the app 410 respectively in the inventive system and browses through the available content 411. Alternatively or additionally, he follows the shopping links stored under app album news and gets preferably directly to an offer. The user transfers the offer in the shopping cart and accepts the purchase actively. As a registered operator of the inventive system all payment information are preferably already stored and downloading of the new content (digital media, particularly music) starts particularly preferably immediately.

Therefore, the inventive system preferably can be understood as a system for downloading as well as for distribution and for the acoustic reproduction of digital media files, wherein the digital music files are provideable as data sets for downloading and wherein the digital music files as data sets are pre-holdable grouped as music album in a data memory of an end-user-device after downloading and wherein the digital music files are treatable by a treatment means in dependence of an authorization, and wherein the treated music files are transferable to an output device of the end-user-device, in particular a speaker means with or without a display device coupled therewith, for acoustic output to an user.

Furthermore, it is conceivable that the unencrypted data respectively data sets respectively digital media are also partially or completely pre-holdable as encrypted data, data sets or digital media, especially in the storage means.

Therefore, the inventive system may be preferably understood as a system for downloading, for the distribution and for the acoustic reproduction of digital music files corresponding to a music album, wherein the digital music files are provideable for downloading as data sets and wherein the digital music files as data sets are pre-holdable grouped as music album in a data memory of an end-user-device after downloading and wherein the digital music files are treatable by a treatment means in dependence of an authorization, and wherein the treated music files are transferable to an output device of the end-user-device, in particular a speaker means with or without a display device coupled therewith, for acoustic output to an user.

The inventive system 100 particularly preferably has to be understood particularly as an application for downloading, for distribution and for acoustic playback of a music album, which includes at least one or several digital music files and/or multimedia content in the form of one or several multimedia files corresponding to the music files. Hereby the music files and/or multimedia files are provideable as data sets for downloading, after downloading the music file and/or multimedia file are as data sets pre-holdable grouped corresponding to a music album in a data memory of an end-user-device 101, 103, 104, the music file and/or multimedia file is treatable with a treatment means 2 in dependency to an authorization and the treated music file and/or multimedia file is transferable to an output device of the end-user-device 101, 103, 104, especially a speaker device with or without a display device coupled therewith, in that manner that the music file and/or multimedia file can be emitted at least acoustically to one user.

Figure 14A:
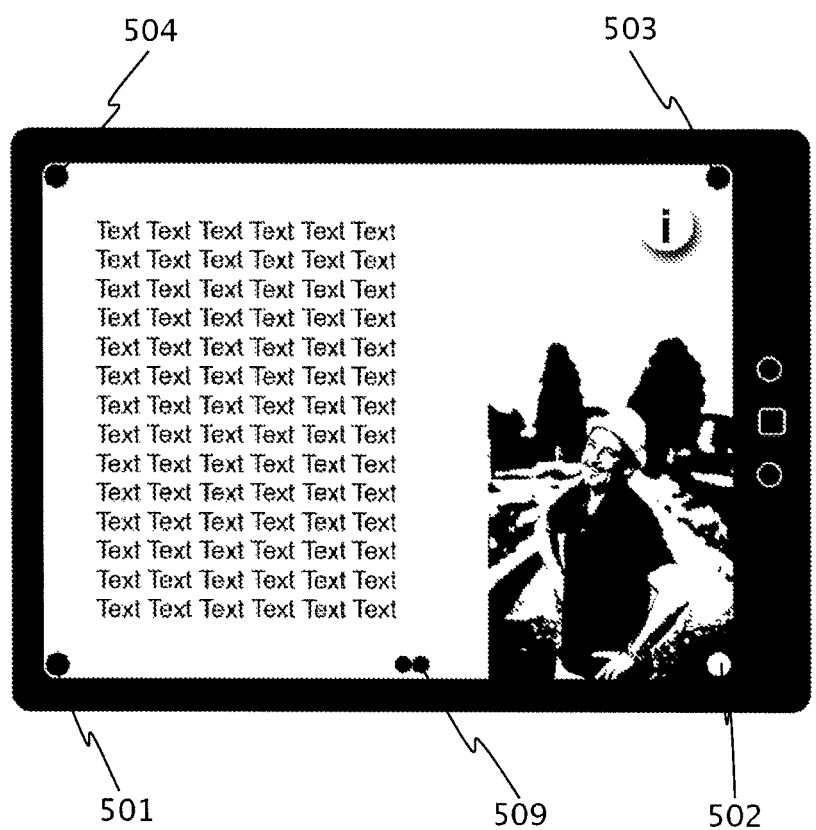
FIG. 14a shows a system according to the disclosure with intuitive actuating elements.

In FIG. 14a interactive lyrics are shown, which are provided with active corners. The active corners 501-504 represent elements for guidance of the user respectively operator of the end-user-device. The elements 501-504 can be shaped as circles, squares or any other symbol. They are preferably always active or can be made active respectively inactive by fading them in or out, that preferably means displaying them or not displaying them. The corners respectively the individual symbols or all symbols are linked to the home section, the social media section, the song section and/or a play or stop button. If e.g., the corner symbol 502 is actuated the song which is outputted may stop respectively start where the song was stopped respectively paused. The linking between the active corners 501-504 respectively the symbols representing that active corners 501-504 and specific functions can be preferably set up independently of specific rules, that preferably means that the active corners can be linked to each section respectively functional section of the present system.

Reference sign 509 indicates further symbols representing functions to manipulate the output of the end-user-device. The symbols 509 can be preferably located where ever the user of the end-user-device wants them to be. Furthermore, that symbols 509 may link to the same functions the other symbols 501-504 link and/or to further functions.

Figure 14B:
FIG. 14b shows a further system according to the disclosure with another arrangement of the actuating elements.

In FIG. 14b an example for a start screen of the system according to present disclosure is shown. The start screen can therefore be equipped with active corners 501-504 as discussed with respect to FIG. 14a. Symbols respectively linked functions like 509 are not present but could also be provided.

While exemplary embodiments are described above, it is not intended that these embodiments describe all possible forms of the invention. Rather, the words used in the specification are words of description rather than limitation, and it is understood that various changes may be made without departing from the spirit and scope of the disclosure. Additionally, the features of various implementing embodiments may be combined to form further embodiments of the invention.

What is claimed is:

1. A method comprising:
   obtaining, by an application executing on an end-user device, a data set from a live stream, wherein the live stream is transmitted by a server to a container stored in the end-user device, wherein the application prevents the data set from being copied outside the container on the end-user device, and wherein the data set in the container is inaccessible by other applications executing on the end-user device;
   displaying, by the application, a plurality of labels corresponding to a single or plurality of media files, wherein the single or plurality of media files correspond to the data set;
   obtaining, by the application and from a user, a selection of a label of the single or plurality of labels;
   obtaining, by the application, a decryption key;
   decrypting, by the application and using the decryption key, a portion of the data set within the container; and
   rendering, by the application and while the end-user device is not connected with the server, an output at an output device disposed on the end-user device,
   wherein the application renders the output at a time displaced from an event time of the live stream, and
   wherein the output corresponds to the portion of the data set decrypted by the decryption key and the label selected by the user.

2. The method of claim 1, wherein the output is an acoustic output, and wherein the output device is a speaker.

3. The method of claim 1,
   wherein the label corresponds to the live stream, and
   wherein the live stream is for an online access event.

4. The method of claim 1, further comprising:
   obtaining, by the application, user credentials; and
   transmitting, by the application, the user credentials to the server,
   wherein the decryption key is obtained from the server in response to the server authenticating the user credentials.

5. The method of claim 1, further comprising:
   accessing, by the application, an online music store;
   downloading, by the application, the media file from the online music store; and
   storing, by the application, the media file in the container.

6. The method of claim 1, wherein the data set comprises a start time and duration of the live stream.

7. The method of claim 1, further comprising:
   accessing, by the application, an online music store;
   downloading, by the application, an application album comprising the plurality of media files and the plurality of labels from the online music store; and
   storing, by the application, the plurality of media files in the container.

8. The method of claim 7, further comprising:
   displaying, by the application, a digital interactive booklet for navigation by the user while the media file is playing;
   wherein the interactive booklet is associated with an artist of the media file; and
   wherein the application album comprises the interactive booklet.

9. The method of claim 1, further comprising:
   downloading the application comprising the plurality of labels and the container storing the plurality of media files; and
   installing the application on the end-user device,
   wherein the application, the plurality of labels, and the plurality of media files corresponds to a single musical album.

10. An end-user device, comprising:
    a computer processor;
    an output device;
    a container coupled to the computer processor and the output device, the container comprising a data set from a live stream that is transmitted from a server to the container; and
    a memory coupled to the computer processor, the container, and the output device, the memory comprising a software application that prevents the data set from being copied outside the container and instructions executable by the computer processor, wherein the instructions are configured to:
       display a plurality of labels corresponding to a single or plurality of media files, wherein the single or plurality of media files correspond to the data set;
       obtain, from a user, a selection of a label of the single or plurality of labels;
       obtain a decryption key;
       decrypt, using the decryption key, a portion of the data set within the container, wherein the data set in the container is inaccessible by other software applications being executed by the computer processor; and
       render, while no connection exists between the container and the server, an output at the output device,
       wherein the software application renders the output at a time displaced from an event time of the live stream, and
       wherein the output corresponds to the label selected by the user and the portion of the data set decrypted by the decryption key.

11. The end-user device of claim 10,
    wherein the label corresponds to the live stream, and
    wherein the live stream is for an online access event.

12. The end-user device of claim 10, wherein the memory further comprises instructions configured to:
    obtain user credentials; and
    transmit the user credentials to the server,
    wherein the decryption key is obtained from the server in response to the server authenticating the user credentials.

13. The end-user device of claim 10, wherein the output is an acoustic output, and wherein the output device is a speaker.

14. A non-transitory computer readable medium, comprising:
    a container comprising a data set from a live stream; and
    an application that prevents the data set from being copied outside the container, wherein the application is configured to:
obtain, from a user, a selection of a label of a single or plurality of labels;
obtain a decryption key;
decrypt, using the decryption key, a portion of the data set, wherein the data set in the container is inaccessible by other applications outside the application; and
render, while no connection exists between the application and a server, an output at an output device,
wherein the application is configured to render the output at a time displaced from an event time of the live stream, and
wherein the output corresponds to the label selected by the user and the portion of the data set decrypted by the decryption key.

15. The non-transitory computer readable medium of claim 14, wherein the output is an acoustic output, and wherein the output device is a speaker.

16. The non-transitory computer readable medium of claim 14,
wherein the label corresponds to the live stream, and
wherein the live stream is for an online access event.

17. The non-transitory computer readable medium of claim 14,
wherein the application is further configured to obtain user credentials and transmit the user credentials to the server, and
wherein the application is further configured to obtain the decryption key from the server in response to the server authenticating the user credentials.

* * * * *